(12) United States Patent
Deixler et al.

(10) Patent No.: US 10,271,409 B2
(45) Date of Patent: Apr. 23, 2019

(54) WIRELESS-COMMUNICATION ENABLED LAMPS

(71) Applicant: SIGNIFY HOLDING B.V., Eindhoven (NL)

(72) Inventors: Peter Deixler, Valkenswaard (NL); Leendert Teunis Rozendaal, Valkenswaard (NL); Haimin Tao, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/756,996

(22) PCT Filed: Aug. 23, 2016

(86) PCT No.: PCT/EP2016/069864
§ 371 (c)(1),
(2) Date: Mar. 2, 2018

(87) PCT Pub. No.: WO2017/036848
PCT Pub. Date: Mar. 9, 2017

(65) Prior Publication Data
US 2018/0263096 A1    Sep. 13, 2018

(30) Foreign Application Priority Data

Sep. 4, 2015    (EP) ..................... 15183820

(51) Int. Cl.
*H04W 4/80* (2018.01)
*H05B 37/02* (2006.01)

(52) U.S. Cl.
CPC ........... *H05B 37/0272* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 2011/0122796 A1* | 5/2011 | Simons | ................... | H04W 4/08 370/254 |
| 2011/0310621 A1* | 12/2011 | Van Der Stok et al. | ..................... | H05B 37/0254 362/311.12 |
| 2015/0373812 A1* | 12/2015 | Feri | .................... | H05B 37/0245 315/152 |

FOREIGN PATENT DOCUMENTS

WO    2012131631 A1    10/2012

* cited by examiner

*Primary Examiner* — Dedei K Hammond
(74) *Attorney, Agent, or Firm* — Meenakshy Chakravorty

(57) ABSTRACT

Each of multiple components, including a first lamp, is operable in a first mode in which it appears to a commissioning tool as awaiting commissioning, and a second mode in which it does not appear as such to the commissioning tool. Each component begins a commissioning process in the first mode. The first lamp then triggers a second one or more of the components (e.g. other lamps) to switch to the second mode, so that during commissioning the second components will not to appear to the commissioning tool as awaiting commissioning. Following this, the first lamp operates in the first mode so that it appears to the commissioning tool as awaiting commissioning (thereby representing the first and second lamps jointly). The first lamp also interacts with the commissioning tool on behalf of the second components, in order for the first lamp and second components to be commissioned as a group.

15 Claims, 5 Drawing Sheets

WIRELESS-COMMUNICATION ENABLED LAMPS

CROSS-REFERENCE TO PRIOR APPLICATIONS

This application is the U.S. National Phase application under 35 U.S.C. § 371 of International Application No. PCT/EP2016/069864, filed on Aug. 23, 2016, which claims the benefit of European Patent Application No. 15183820.8, filed on Sep. 4, 2015. These applications are hereby incorporated by reference herein.

TECHNICAL FIELD

The present disclosure relates to an arrangement of wireless communication enabled lamps, such as retrofittable LED-based replacements for traditional fluorescent tubes or filament bulbs.

BACKGROUND

A luminaire (light fixture) is a device comprising at least one lamp for emitting illumination, and any associated socket, support and/or housing. A luminaire may take any of a variety of forms, such as a conventional ceiling or wall mounted luminaire, free standing luminaire or wall washer, or a less conventional form such as an illumination source built into a surface or an item of furniture, or any other type of lighting device for emitting illumination into an environment. The lamp refers to an individual light-emitting component within a luminaire, of which there may be one or more per luminaire. The lamp may also take any of a number of forms, such as an LED-based lamp, a gas-discharge lamp, or a filament bulb. An increasingly popular form of lamp is a retrofittable LED-based lamp comprising one or more LEDs as the means by which to emit illumination, but being made retrofittable into a luminaire designed for a traditional filament bulb or fluorescent tube.

A luminaire or even an individual lamp may also be equipped with a wireless communication interface allowing the luminaire or lamp to be controlled remotely by lighting control commands received from a user device such as a smartphone, tablet, laptop or desktop computer, or wireless wall-switch; and/or based on sensor readings received from one or more remote sensors. Nowadays, the communication interface can be included directly within the lamp itself (e.g. in the end-cap of a retrofittable replacement for a filament bulb or fluorescent tube). For example this can allow a user, through the user device, to turn the lamp's illumination on and off, to dim the illumination level up or down, to change the colour of the emitted illumination, and/or to create a dynamic (time varying) lighting effect. In one form, the communication interface is configured to receive the lighting control commands and/or to share sensor data via a local, short-range radio access technology such as Wi-Fi, 802.15.4, ZigBee or Bluetooth. Such lamps may sometimes be referred to as "connected" lamps.

One type of connected lamp is an instant-fit "tube LED" (TLED) lamp which retrofits into a luminaire designed for traditional fluorescent tubes. According to the instant-fit TLED approach, the existing fixed-output fluorescent ballast, the TLED lamp-holders and also all the electrical wiring within the luminaire remain unchanged. Via straightforward re-lamping, existing "dumb" fluorescent tubes (or even "dumb" TLED tubes) can be exchanged with dimmable connected TLEDs each having an individual, integrated wireless radio.

However, a project to replace all the old-fashioned tubes in an office with TLEDs, or the like, will require a commissioning process.

Consider the process of commissioning an arrangement of wireless luminaires in which the wireless interface is included in each luminaire's housing on a per luminaire basis (as opposed to a wireless interface being included in each individual wireless lamp). To do this, the commissioning technician has to stand underneath each luminaire that he or she intends to commission (or in visible vicinity of it), and select what he or she believes to be that luminaire on the user interface of a commissioning tool (e.g. a dedicated commissioning device or a commissioning application running on a mobile user terminal such as a smartphone, tablet or laptop). The commissioning tool then broadcasts a commissioning request comprising an identifier of the selected luminaire, and in response the luminaire having that identifier will emit a visual indication (e.g. by blinking via its lamp(s) or a separate indicator light). This way the technician can check whether the selected luminaire is indeed the luminaire that he or she intends to commission. If so, the technician then confirms this to the commissioning tool, and in response the tool adds the confirmed luminaire to a wireless network for controlling the lights in a subsequent operational phase. The commissioning technician then repeats this for each luminaire to be commissioned (e.g. every luminaire in the office).

As alternative, sometimes also pointing methods are applied to identify a specific luminaire during the commissioning process. One example is an infrared remote control being directly pointed to the luminaire featuring an infrared receiver. Another method is to select a luminaire by shining a high-powered torchlight into the daylight sensor of a specific luminaire.

SUMMARY

Consider now the case where a wireless interface is included in each individual wireless lamp. In typical office applications, four TLEDs are included per luminaire. An instant-fit connected TLED based solution hence results in a four times higher number of wireless nodes than the competing approaches applying either a wireless luminaire-renovation kit (for instance the Philips Evokit product) or a new wireless luminaire. Thus the present state-of-the-art solutions for connected TLEDs will result in a very high commissioning effort due to the very high number of wireless nodes per space. I.e. the commissioning technician would have to perform the above-described steps for each lamp, not just each luminaire, by standing under or in visual vicinity of each individual lamp and having it blink to confirm its identity, then individually joining each lamp to the control network. The commissioning technician may also have to identify which lamps are part of the same luminaire in order to allow them to be controlled (e.g. dimmed) as a group after commissioning phase is over. Further, such a process typically requires a relatively highly skilled commissioning technician.

To reduce the burden of commissioning, it would therefore be desirable to provide a commissioning process that does not require commissioning of each lamp individually. For example this could be used to automatically pre-group all the TLEDs or other such retrofittable lamps installed within a given luminaire, upfront at the start of commissioning, so as to allow them to be commissioned as a group and preferably also to allow then to be subsequently controlled via a single wireless address in the operational phase.

The following provides an auto-grouping and commissioning approach for a TLED-based wireless system or other such system of wireless-communication enabled lamps (e.g. downlights in a conference room or spotlights in a hotel lobby), which can allow a user such as commissioning agent or value-added-reseller (VAR) to more easily organize the entire end-to-end migration to wireless lighting control (e.g. to wirelessly controlled LED-based lamps). The installation may even be performed by a low cost employee, because in embodiments, from the user's perspective it need only involve simple re-lamping. For instance the commissioning process disclosed herein may be used for a "stock and flow" business (wherein "stock-and-flow" involves both selling via the wholesale channel and using a "moderately trained" re-lamping labour workforce rather than electricians and highly trained commissioning experts).

As well as new TLEDs installation projects, or such like, in embodiments the process disclosed herein also allows for "out-of-the box" field replacement of broken TLEDs (or other such lamps), enabling auto-grouping without involvement of a remote control or a commissioning expert.

Furthermore, as well as installing or replacing TLEDs or other wireless lamps in the same luminaire, in embodiments the commissioning process disclosed herein may also be applied to other situations where it is appropriate to treat a cluster of lamps as a group. As an example, consider a room such as a kitchen with discrete clusters of spot lights or other such task lights: e.g., a cluster of under-cabinet spots, a cluster of spots over a work-surface island, etc. Another example is a big chandelier with many candle-style light bulbs. As another example, the lamps in different zones of a room such as an office may be treated as a group, e.g. one group per cubicle.

According to one aspect disclosed herein, there is provided a first lamp for use as one of a plurality of wireless-communication enabled lamps, each respective one of the lamps being operable in a first mode in which the respective lamp appears to a commissioning tool as awaiting commissioning and a second mode in which the respective lamp does not appear to the commissioning tool as awaiting commissioning, with each of the lamps being configured to begin in the first mode as part of a commissioning process (i.e. each lamp is configured to participate in a commissioning process, and at the beginning of its participation in the commissioning process, each lamp starts out in the first mode). For instance, the first mode may be the Factory New (FN) mode of the ZigBee Light Link protocol or other such ZigBee protocol, and the second mode may be the non-FN mode of the ZigBee Light Link protocol or other ZigBee protocol.

The first lamp is configured to perform the following steps. To begin, the first lamp triggers a second one or more of the lamps to switch to the second mode (e.g. non-FN mode), so that during the commissioning process the one or more second lamps will not to appear to the commissioning tool as awaiting commissioning. Preferably, the first lamp is configured to select the one or more second lamps to be treated in this manner on the basis of being within a same spatially-defined group as the first lamp, e.g. a same spatial cluster. That is, the one or more second lamps are selected on the basis of having a certain predetermined spatial relationship with the first lamp, e.g. according to some predefined test of proximity, such as being within a same predefined spatial region defined relative to the first lamp. In a particularly advantageous application, the first lamp is configured to perform said triggering of the one or more second lamps to switch to the second mode on the basis of them being in a same luminaire as the first lamp. I.e. the one or more second lamps are those detected by the first lamp as being in the same luminaire as the first lamp (see below).

Following said triggering of the one or more second lamps to switch to the second mode, the first lamp operates itself in the first mode (e.g. FN mode) so that the first lamp will appear to the commissioning tool as awaiting commissioning, thereby representing the first and second lamps jointly to the commissioning tool. The first lamp then interacts with the commissioning tool on behalf of said one or more second lamps, in order to commission the first and second lamps as a group (there are various options for this interaction by the first lamp, whether by just initially contacting the tool to initiate the commissioning between the tool and second lamps, or by playing a greater role in coordinating the commissioning of the second lamps).

Thus by artificially manipulating the Factory New mode (or such like), it is possible to provide an automatic "pre-commissioning" whereby the lamps are automatically treated as a group for the purpose of commissioning, with one lamp (the first lamp) acting as the representative of the others. Advantageously, the one or more second luminaries in the same group (e.g. same luminaire) are thus hidden from the commissioning tool, and from the perspective of the user performing the commissioning, the process can proceed on a per group (e.g. per luminaire) basis.

In embodiments, each respective lamp is configured to switch to the second mode (e.g. non-FN mode) in response to joining a wireless network of a predetermined wireless networking protocol (e.g. the ZigBee Light Link protocol). In this case, the first lamp may be configured to perform said switching of the one or more second lamps to the second mode (e.g. non-FN mode) by emitting a first message causing the second lamps to join a first wireless network created by the first lamp according to said wireless networking protocol, thereby causing the first and second lamps switch to the second mode (e.g. non-FN mode); and said step of the first lamp operating in the first mode (e.g. FN mode) may comprise the first lamp exiting the first wireless network, following said switching of the first and second lamps to the second mode (e.g. non-FN mode), so as to return itself to the first mode (e.g. FN mode) and thereby be discoverable to the commissioning tool.

In embodiments, the first lamp may be configured to detect a second message (e.g. ZigBee beacon) emitted by each of one or more of said plurality of lamps, each second message communicating an attribute of the respective lamp (e.g. an identifier such as its address); and the first lamp may be further configured to determine whether to become a master for purpose of the commissioning process by comparing a corresponding attribute of the first lamp with the attribute received in each of one or more of the detected second signals, and to perform the above pre-commissioning steps on condition of being the master. I.e. the first lamp, which acts as a representative of the one or more second lamps in its same group, also acts as a master and treats the one or more second lamps in its same group (e.g. same luminaire) as slaves for the purpose of the commissioning, such that it will instruct its respective second lamps to perform one or more actions as part of the commissioning process. The first lamp elects itself as master based on a distributed protocol whereby each lamp compares a value assigned to itself with the value of the same attribute assigned to other lamps as received in their beacons. E.g. the master may be the lamp with lowest address from amongst those detected.

In embodiments, the first lamp is configured so as, subsequent to the commissioning of said first and second lamps, to allow a next one of said plurality of lamps in a further luminaire or group to become a master in order to commission the lamps of a further luminaire or group. The first lamp does this by indicating in a message from the first lamp that (despite the fact that it is back in the first mode and beaconing) the first lamp has already been a master. Thus it will not be taken into account again by the distributed protocol for selecting the next master.

The commissioning that is performed on a group basis may comprise one or more of a number of possible commissioning operations.

For example, the first lamp may be configured to receive identifiers of the one or more second lamps, e.g. via the first wireless network (e.g. the local ZigBee network created between the first and second lamps), or via other means such as coded light or load modulation (see later). Said interaction with the commissioning tool may then comprise the first lamp reporting the identifiers of the one or more second lamps to the commissioning tool. Alternatively, said interaction may comprise receiving, on behalf of the first and second lamps, a request from the commissioning tool; and the first lamp may be configured, in response, to send a message to the one or more second lamps via the first wireless network, causing the one or more second lamps to report their own respective identifiers to the commissioning tool.

As another example, said interaction may comprise receiving, on behalf of the first and second lamps, a request from the commissioning tool; and the first lamp may be configured, in response, to cause one or more of the first and second lamps to produce a visual indication to the user of the commissioning tool, indicating a grouping of the first and second lamps collectively (e.g. only the first lamp blinks, or the first lamp causes the first and second lamps to blink together). This enables a user to confirm that the luminaire or group of lamps being commissioned is indeed the luminaire or group the user intended, and to confirm a physical location of the group of lamps being commissioned.

As another example, said interaction with the commissioning tool may comprise: the first lamp joining a second wireless network, and also causing the one or more second lamps to exit the first wireless network in order to join the second wireless network, the second network being for controlling the lamps once the commissioning process is finished. The second network may use the same wireless networking protocol as the first network, e.g. it may be a further ZigBee network. This second network may be a wider network incorporating the lamps of multiple luminaires or groups. It is used later in the operational phase to allow the lamps to be controlled (e.g. dimmed based on commands from a lighting controller and/or sensor readings from one or more wireless sensors).

In further embodiments, said interaction with the commissioning tool may comprise: being assigned, by the commissioning tool, a group address for jointly controlling said the first lamp and the one or more second lamps via the second wireless network.

In yet further embodiments, the first lamp may be further configured to perform steps of: after the commissioning process, detecting a replacement for one of the one or more second lamps in the same luminaire or group (the replacement lamp beginning in the first mode upon replacing said one of the second lamps), and causing the replacement lamp to join the second wireless network (and thereby also causing the replacement lamp to switch to the second mode, e.g. non FN mode). Preferably the first lamp is also configured to cause the replacement lamp to be added to the group address. Thus the replacement lamp gets allocated to the same group(s) that the lamp used to belong to, and fully takes over the role of the broken lamp.

Note that in any given embodiment, any one or more of the group commissioning operations mentioned above (involving the interaction with the commissioning tool) may be applied alone or in combination. Further, in embodiments, any of these may be performed in response to a request from the commissioning tool, and where multiple such commissioning operations are involved, any of them may be performed in response to the same request message from the commissioning tool or separate requests from the tool.

According to another aspect disclosed herein, there is provided a luminaire comprising a first lamp and one or more second lamps, each respective one of the lamps being operable in a first mode in which the respective lamp appears to a commissioning tool as awaiting commissioning and a second mode in which the respective lamp does not appear to the commissioning tool as awaiting commissioning, with each of the lamps being configured to begin a commissioning process in the first mode; wherein the first lamp is configured to perform steps of: triggering a second one or more of the lamps to switch to the second mode, so that during the commissioning process the one or more second lamps will not to appear to the commissioning tool as awaiting commissioning; following said switching of the one or more second lamps to the second mode, operating in the first mode so that the first lamp will appear to the commissioning tool as awaiting commissioning; and interacting with the commissioning tool on behalf of said one or more second lamps, in order to commission the first and second lamps as a group.

According to another aspect disclosed herein, there is provided a system comprising a plurality of wireless-communication enabled lamps including a first lamp and one or more second lamps, each respective one of the lamps being operable in a first mode in which the respective lamp appears to a commissioning tool as awaiting commissioning and a second mode in which the respective lamp does not appear to the commissioning tool as awaiting commissioning, and each of the lamps being configured to begin a commissioning process in the first mode; wherein the first lamp is configured to perform steps of: triggering a second one or more of the lamps to switch to the second mode, so that during the commissioning process the one or more second lamps will not to appear to the commissioning tool as awaiting commissioning; following said switching of the one or more second lamps to the second mode, operating in the first mode so that the first lamp will appear to the commissioning tool as awaiting commissioning; and interacting with the commissioning tool in order for the first and second lamps to be commissioned as a group.

According to another aspect disclosed herein, there is provided a method of operating a plurality of wireless-communication enabled lamps, each respective one of the lamps being operable in a first mode in which the respective lamp appears to a commissioning tool as awaiting commissioning and a second mode in which the respective lamp does not appear to the commissioning tool as awaiting commissioning; the method comprising steps of: beginning a commissioning process with each of the lamps in the first mode; causing a second one or more of the lamps to switch to the second mode, so that during the commissioning process the one or more second lamps will not to appear to the commissioning tool as awaiting commissioning; following said switching of the one or more second lamps to the second mode, operating the first lamp in the first mode so that the first lamp will appear to the commissioning tool as awaiting commissioning; and using the first lamp to interact with the commissioning tool in order for the first and second lamps to be commissioned as a group.

According to another aspect disclosed herein, there is provided a computer program product for operating a first lamp as one of a plurality of wireless-communication enabled lamps, each respective one of the lamps being operable in a first mode in which the respective lamp appears to a commissioning tool as awaiting commissioning and a second mode in which the respective lamp does not appear to the commissioning tool as awaiting commissioning, and each of the lamps being configured to participate in a commissioning process starting in the first mode; wherein the computer program product comprises code embodied on a computer-readable storage medium and/or being downloadable therefrom, and being configured so as when run on the first lamp to perform steps of: triggering a second one or more of the lamps to switch to the second mode, so that during the commissioning process the one or more second lamps will not to appear to the commissioning tool as awaiting commissioning; following said switching of the one or more second lamps to the second mode, operating the first lamp in the first mode so that the first lamp will appear to the commissioning tool as awaiting commissioning; and interacting with the commissioning tool in order for the first and second lamps to be commissioned as a group.

In embodiments, any of the first lamp, luminaire, system, method and computer program may further comprise features in accordance with any of the teachings herein.

According to further aspects of the present invention, there are provided an apparatus, method and computer program for detecting whether lamps are in the same luminaire, and for identifying those lamps. This may be used to detect lamps in the same luminaire for the purpose of commissioning, and/or for other purposes such as to detect a replacement lamp at a later stage.

Hence according to one aspect of the present disclosure, there is provided a first lamp for use in a luminaire, the first lamp comprising: a transmitting circuit configured to transmit, and/or a receiving circuit configured to receive, one or more signals via a constrained signalling channel whereby propagation of the signals is constrained by a physical characteristic of the luminaire; and a controller configured to detect, based on the transmission and/or reception of said one or more signals via said constrained signalling channel, that one or more other, second lamps are present in the same luminaire as the first lamp, and to identify the one or more second lamps based on the transmission and/or reception of said one or more signals.

That is, the fixture has a containing or confining effect on the signal, acting as a physical barrier or hindrance, and based on this the controller on the first lamp can be configured to infer the presence of the one or more second lamps in the same luminaire, and to identify those lamps.

In a particularly preferred embodiment, this is achieved by signalling through a power supply circuit (e.g. ballast) incorporated within the luminaire, i.e. so said signalling channel is the power supply circuit of the luminaire, and said physical characteristic constraining the signal is the fact that the signal only travels through the local power supply circuit (e.g. ballast) within the luminaire and so is only conveyed to other lamps sharing the same power supply circuit.

Alternatively however, the constrained signalling channel may comprise a coded light, ultrasound and/or radio channel, with the propagation of said one or more signals being constrained by at least part of a housing of the luminaire.

In embodiments, the first lamp may comprise at least the transmitting circuit, configured to transmit at least a respective one of said signals to each of the one or more second lamps, and the controller may be configured to detect the one more second lamps based on receiving back a response message from each of the second lamps in response to the transmission of the respective signal. Preferably, the first lamp comprises an alternative interface (e.g. a wireless interface) for receiving messages via another (e.g. wireless) channel other than said constrained signalling channel, and the controller is configured to use said alternative interface to receive said response message via said other channel. This other channel may be one that is not subject to said physical constraint imposed by the luminaire (either not constrained at all, or at least to a lesser extent). E.g. the wireless interface may be a ZigBee, Wi-Fi, 802.15.4, or Bluetooth interface.

In embodiments wherein the constrained signalling channel comprises the power supply circuit within said same luminaire for supplying power to the first and second lamps, the transmitter is configured to perform said transmission by modulating the power supplied by said power supply circuit, the propagation of the one or more signals thereby being constrained to the power supply circuit within the same luminaire as the first and second lamps.

The transmitting circuit may be configured to perform said modulation by modulating a load placed on the power supply circuit by the first lamp. E.g. this modulation may comprise on-off keying, whereby the load is selectively shorted, or selective switched in and out of the power supply circuit.

In alternative or additional embodiments, the first lamp may comprise at least the receiving circuit, configured to receive at least a respective one of said signals from each of the one or more second lamps via said constrained signalling channel, and the controller may be configured to identify the one or more second lamps based on a message conveyed in each of the respective received signals.

In embodiments where the constrained signalling channel comprises the power supply circuit within said same luminaire for supplying power to the first and second lamps, the propagation of the one or more signals is thereby constrained to the power supply circuit within the same luminaire as the first and second lamps; and the receiving circuit is configured to receive said signal by detecting modulations in the power supplied by said power supply circuit of the luminaire.

In embodiments, the first lamp may be configured to use a combination of two or more methods to detect which lamps are in the same luminaire. That is, the transmitting circuit may be configured to transmit, and/or the receiving circuit may be configured to receive, a respective one or more signals via each of a plurality of different a signalling channels, each being a channel whereby propagation of the signals is constrained by a physical characteristic of the luminaire; and the controller may be configured to is configured detect and identify the one or more other, second lamps in the same luminaire as the first lamp based on the transmission and/or reception of the one or more signals communicated via each of said plurality of signalling channels.

In embodiments, the power supply used for the signalling is a ballast. In embodiments, the first lamp may take the form of a retrofittable LED replacement for a florescent tube, said ballast being a ballast for powering a fluorescent tube.

In embodiments, the first lamp may comprise a wireless interface (e.g. ZigBee, Wi-Fi, 802.15.4, or Bluetooth) for receiving a respective beacon from each of a plurality of other lamps via another, wireless channel other than said constrained signalling channel, said plurality of other lamps including but not being limited to said one or more second lamps; and the controller may be configured to use the wireless interface to measure a received signal strength of the respective beacon from each of said plurality of other lamps, to determine a subset of lamps from amongst the plurality of lamps based on the received signal strengths, and then to use the one or more signals transmitted and/or received via said constrained signalling channel to detect and identify the one or more second lamps from amongst said subset. For example, the subset may be selected as those whose beacons are received with above a threshold signal strength, or may be selected as the N lamps whose beacons are received with the strongest signal strengths (where N is a predetermined integer).

In embodiments, the constrained signalling channel can also be used to detect a replacement for a replaced lamp. That is, in embodiments: each of the first and second lamps may be configured to communicate via a wireless network; at least one of the second lamps may comprise a replacement component being a replacement of a previous instance of that lamp previously used in the luminaire; and the controller of the first lamp may be further configured to automatically detect the replacement lamp as being a replacement based on the transmission and/or reception of at least one of the signals via said constrained signalling channel, and to automatically cause the replacement lamp to be joined to said wireless network upon the replacement.

Alternatively or additionally, the controller of the first lamp may configured to automatically detect within the luminaire, based on the transmission and/or reception of at least one further signal via said constrained signalling channel, a replacement lamp being a future replacement for one of the one or more second lamps, and in response to automatically cause the replacement lamp to be joined to said wireless network.

According to another aspect disclosed herein, there is provided a luminaire comprising a first lamp and one or more second lamps, wherein the first lamp comprises: a transmitting circuit configured to transmit, and/or a receiving circuit configured to receive, one or more signals via a constrained signalling channel whereby propagation of the signals is constrained by a physical characteristic of the luminaire; and a controller configured to detect, based on the transmission and/or reception of said one or more signals via said constrained signalling channel, that one or more other, second lamps are present in the same luminaire as the first lamp, and to identify the one or more second lamps based on the transmission and/or reception of said one or more signals.

According to another aspect disclosed herein, there is provided a computer program product for operating a first lamp within a luminaire, the computer program product comprising code embodied on a computer-readable storage medium and/or being downloadable therefrom, and being configured so as when run on the first lamp to perform operations of: transmitting from the first lamp, and/or a receiving at the first lamp, one or more signals via a constrained signalling channel whereby propagation of the signals is constrained by a physical characteristic of the luminaire; and based on the transmission and/or reception of said one or more signals via said constrained signalling channel, that one or more other, second lamps are present in the same luminaire as the first lamp, and identifying the one or more second lamps based on the transmission and/or reception of said one or more signals.

According to another aspect disclosed herein, there is provided a method of commissioning a luminaire comprising a first lamp and one or more second lamps, the method comprising: transmitting from the first lamp, and/or a receiving at the first lamp, one or more signals via a constrained signalling channel whereby propagation of the signals is constrained by a physical characteristic of the luminaire; and based on the transmission and/or reception of said one or more signals via said constrained signalling channel, that the one or more second lamps are present in the same luminaire as the first lamp, and identifying the one or more second lamps based on the transmission and/or reception of said one or more signals.

According to another aspect disclosed herein, there is provided a second lamp for use in a luminaire, the second lamp comprising: a receiving circuit configured to receive a signal from a first lamp via a constrained signalling channel whereby propagation of the signals is constrained by a physical characteristic of the luminaire; and a controller configured to detect the reception of said signal and identify the first lamp based on said signal. In embodiments the second lamp further comprises an alternative interface (e.g. a wireless interface such as a ZigBee interface) for transmitting messages via another (e.g. wireless) channel other than said constrained signalling channel; wherein the controller may be configured to use said alternative interface to respond to said signal received over said constrained signalling channel, by sending a message identifying the second lamp to the first lamp via said other channel.

In embodiments, any of the first lamp, second lamp, system, method and computer program may further comprise features in accordance with any of the teachings herein.

Further, note that the scope of the present disclosure can also extend to the commissioning of other components, not just lamps, and/or to detecting whether one or more other components are in the same luminaire as a lamp. Hence in any of the above embodiments of any of the above aspects described in relation to lamps, or anywhere herein where there is mentioned a lamp, the lamp may be more read generally as a component. In embodiments of any aspect, the first lamp is indeed a lamp, but where there are recited a one or more second lamps, these may be read more generally as one or more second components. For example, the one or more second components may comprise one or more components that may be found housed in a luminaire along with the first lamp, e.g. a smoke detector component, a security camera, a driver for driving the lamp, and/or a battery such as an emergency battery for powering the first lamp.

According to a yet further aspect disclosed herein, there is provided a method of replacing one of a plurality of replaceable components in a luminaire, wherein the components include at least one lamp and are arranged to communicate via a wireless network; the method comprising: using one of the components to automatically detect a replacement for another of the components; and in response, said one of the components automatically causing the replacement component to join the wireless network.

In embodiments, this latter aspect may be used in conjunction with any of features of any of the other aspects or embodiments disclosed above or elsewhere herein, or may be used independently of these. Particularly, note that this aspect relating the replacement of components may be used together with any of the initial commissioning features disclosed herein, or with a different commissioning process; and/or the detection of the replacement lamp may be implemented with the mechanism disclosed herein for detecting whether lamps or components are in the same luminaire, or a different detection mechanism (e.g. a look-up based on pre-stored mapping of lamps to luminaires).

According to another aspect, there is a provided a first lamp configured to perform the above method. According to another aspect, there is provided a luminaire comprising this first lamp and the one or more other components.

BRIEF DESCRIPTION OF THE DRAWINGS

To assist understanding of the present disclosure and to show how embodiments may be put into effect, reference is made by way of example to the accompanying drawing in which.

DETAILED DESCRIPTION OF EMBODIMENTS

Figure 1:
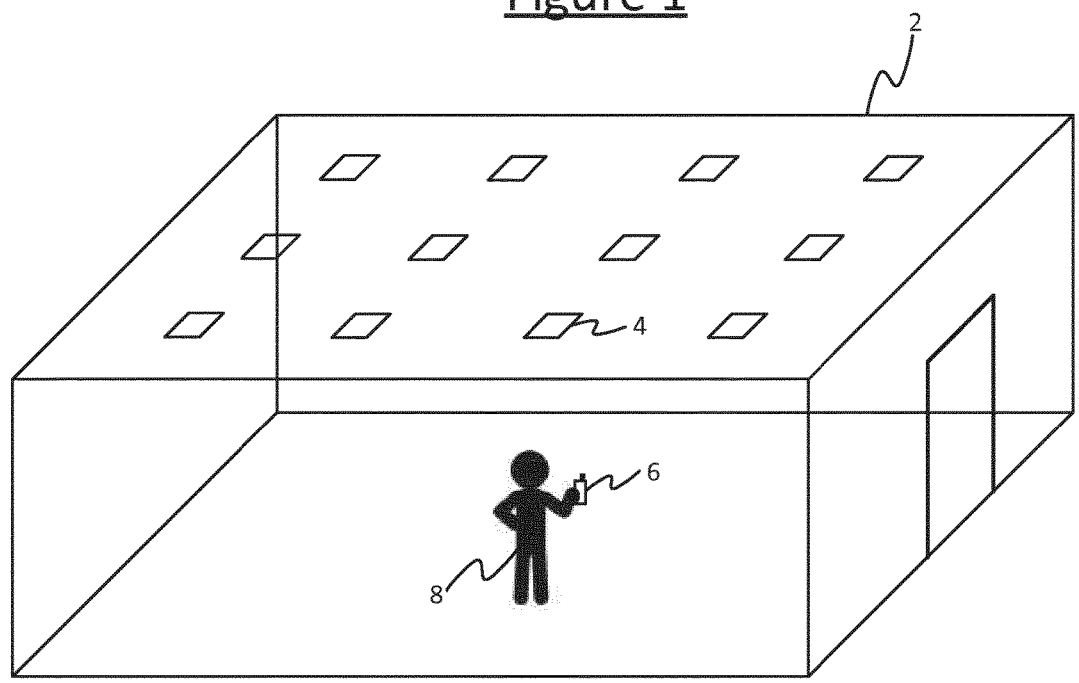
FIG. 1 is a schematic illustration of an environment in which a lighting system is deployed.

The following provides an auto-commissioning method for auto-grouping of multiple connected TLED tubes, or other such wireless lamps, which are residing within the same luminaire. In embodiment, the auto-grouping method builds upon the insight that TLEDs residing within the luminaire are wired to one shared fluorescent ballast. To exploit this, a verification that TLEDs share the same ballast is performed via intentional load change patterns imprinted by one master TLED onto the ballast. The load change experienced by the fluorescent ballast—depending on the ballast type—results either in shifts of the ballast frequency and/or the lamp currents provided by the fluorescent ballast towards the other, slave TLEDs within the luminaire. Upon detection of the frequency or current shift patterns caused by the master TLED, each of the one or more slave TLEDs can conclude with certainty that it shares the same the same ballast and hence that it is within the luminaire with the master TLED.

The following disclosure also provides a network joining mechanism optimized for TLEDs. Initially only the Master Connected TLED is visible as Factory New lamp to the installer. Once the installer adds the Master TLED to the ZigBee network, which is set up by a lighting bridge or remote control, the slave TLEDs residing within the same luminaire are then enabled to join the same ZigBee network as well without any additional action being required from the installer. The disclosure further provides a "ballast-load-drop-based" auto-grouping method aimed at the replacement of broken connected TLEDs without requiring installer intervention.

To increase the speed of the TLED auto-grouping, preferably the procedure starts with a faster and less intrusive (but also less deterministic) evaluation method. That is, firstly the TLEDs within the same luminaire can be assumed to be likely to be within a relatively small "wireless" vicinity compared to the typical spacing to the nearest neighbour luminaire. Hence based upon radio RSSI (or alternatively coded light), the TLEDs may be grouped into buckets such as "likely within same luminaire", "may be in same luminaire", "unlikely within same luminaire". Then, starting from the initial RSSI-based TLED buckets, the method proceeds to use the load modulation to determine with certainty which of the TLEDs are connected to a shared fluorescent ballast, and are therefore for sure located within the same luminaire.

The presented auto-commissioning approaches are particularly suitable for automatically grouping connected TLEDs located within one luminaire. Nonetheless, whilst embodiments may be described in terms of TLEDs by way of illustration, note that the techniques disclosed herein can also apply to the grouping of other types of wireless lamp, e.g. other types of LED-based lamp such as retrofittable LED-based replacements for traditional filament bulbs, or even non-LED based lamps.

Some example embodiments are now described in more detail in relation to FIGS. 1 to 8.

FIG. 1 illustrates an example lighting system in which the disclosed techniques may be implemented. The system comprises one or more luminaires 4 installed or otherwise deployed in an environment 2, arranged to emit illumination in into that environment 2. The environment 2 may be an indoor space such as one or more rooms and/or corridors of a building; or an outdoor space such as a park, garden, road, or outdoor parking area; or a partially covered space such as a stadium, structured parking facility or gazebo; or any other space such as an interior of a ship, train or other vehicle; or any combination of such possibilities.

Each of the luminaires 4 comprises at least one respective lamp such as an LED-based lamp, gas-discharge lamp or filament bulb, plus any associated support, casing or other such housing. Each of the luminaires 4 may take any suitable form such as a ceiling or wall mounted luminaire, a free standing luminaire, a wall washer, a chandelier; or a less conventional form such as embedded lighting built into an item of furniture, a building material such as glass or concrete, or any other surface. In general a luminaire 4 may be any type of illumination device for emitting illumination into the environment 2. In embodiments the luminaire 4 is one which is designed to emit illumination suitable for illuminating an environment 2, i.e. functional lighting—a device designed and used to allow users to see and find their way about within the environment 2, providing or substantially contributing to the illumination on a scale adequate for that purpose. Nonetheless, instead of providing functional lighting (or as well as providing functional lighting), it is also possible that the luminaire 4 is a device designed to generate a lighting effect, such as task lighting, accent lighting or mood lighting; e.g. an embedded luminaire embedded in a surface which changes colour.

Figure 2:
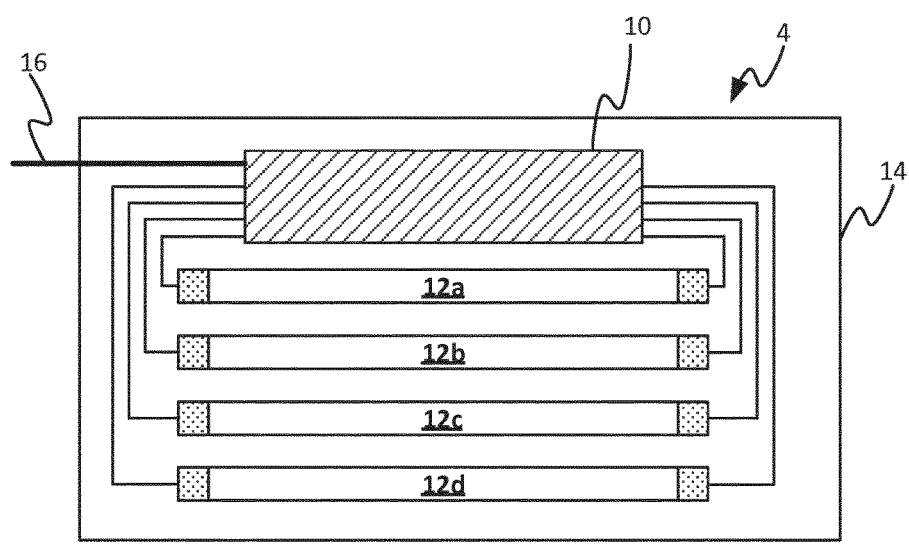
FIG. 2 is a schematic block diagram of a luminaire comprising a plurality of lamps.

An example of one of the luminaires 4 is shown in FIG. 2. Each luminaire 4 comprises a power supply circuit 10, one or more lamps 12, and a housing 14. In fact, at least one of the luminaires 4, and in embodiments some or all of the luminaires 4, each comprise a plurality lamps 12. In this case, the luminaire 4 comprises an internal power supply circuit 10 of the luminaire, and sockets for connecting a plurality of lamps 12 to the power supply circuit 10 in order to power those lamps 12. E.g. by way of example, FIG. 2 shows four lamps 12a, 12b, 12c, 12d in the same luminaire 4 (but note that while the following embodiments may be descried in terms of this example, this is not limiting and the luminaire 4 may support other numbers of lamps 12). Being in the same luminaire 4 herein means the lamps in question share the same power supply circuit 10 and the same housing 14. Hence the lamps 12a-d may be described as "cohabiting" in the same luminaire 4. In general the "housing" 14 may refer to any casing and/or supporting structure of the fixture. E.g. in embodiments the housing 14 may comprise an opaque upper and/or side-wall casing for mounting on the ceiling, plus a plurality of sockets mechanically connected to the upper casing, and a lower diffuser element for diffusing the illumination emitted downwards by the lamps 12a-d into the environment 2. In another example form however, the "housing" 14 may take the form of a hanging structure such as a chandelier style structure supporting a plurality of sockets (and the casing element is not necessarily present).

The power supply circuit 10 connects to an upstream power supply 16, e.g. the mains supply, and is configured to generate a power supply suitable for powering lamps based on this. E.g. typically the power supply circuit 10 takes the form of a ballast, i.e. a device for limiting the current supplied to the lamps in its luminaire 4.

In embodiments, one or more of the luminaires 4 may each take the form of a fluorescent luminaire having sockets for accepting a plurality of fluorescent tubes. In this case, the lamps 12a-d may take the form of "tube LEDs" (TLEDs), i.e. retrofittable LED-based lamps designed to replace the fluorescent tubes in a conventional fluorescent luminaire designed for traditional fluorescent tubes. For instance, most office luminaires take two to four TLED tubes per fixture (though it is not excluded that some, but not all, others of the luminaires may have only a single TLED).

Table 1 shows an overview of the typical number of TLED tubes 12 and ballasts 10 per luminaire 4 for the EMEA (Europe, Middle East and Africa) and NAM (North American) regions. In almost all situations, only one ballast 10 is present per luminaire 4. In the USA, TLEDs 12a-d within the same fixture are always connected to single fluorescent ballast 10.

| Region | Luminaire type | Number of TLED tubes | Number of ballasts |
|---|---|---|---|
| EMEA | 2 ft × 2 ft square luminaire | 4 | 1 |
|  | 5 ft 1-lamp luminaire | 1 | 1 |
|  | 5 ft 2-lamp luminaire | 2 | 1 (or in some rare cases 2) |
|  | 4 ft 1-lamp luminaire | 1 | 1 |
|  | 4 ft 2-lamp luminaire | 2 | 1 |
| NAM | 2 ft × 2 ft troffer | 4 | 1 |
|  | 2 ft × 4 ft troffer | 4 or 3 | 1 |

Figure 3:
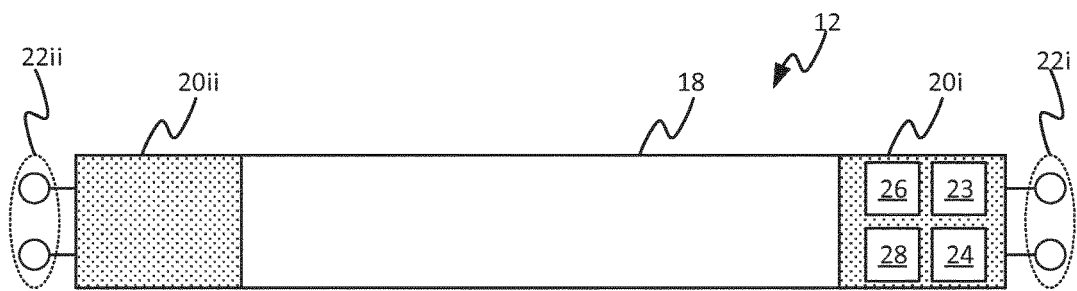
FIG. 3 is a schematic block diagram of a lamp.

FIG. 3 illustrates an individual TLED lamp 12, which may represent any of the lamps 12a-d used in the luminaire 4 described in relation to FIG. 2.

As shown, the lamp 12 comprises an actual lighting element 18, such as a string or other array of LEDs. The lamp 12 also comprises at least one end-cap 20, and in the case of a TLED replacing a fluorescent tube, the lamp 12 in fact comprises two end-caps 20i, 20ii. Each end-cap 20i, 20ii comprises a respective connector 22 for connecting the lamp 12 to the ballast 10 via a socket of the luminaire 4, and thereby connecting the lighting element 18 to the power supplied by the ballast 10. In the case of a fluorescent tube, each connector 22 in fact comprises two terminals (a pair of pins) being either terminal of a receptive filament, though in the case of a TLED replacing a fluorescent tube, the two terminals of each connector are typically shorted together as the need for two terminals is a specific requirement of fluorescent tubes and is not necessarily relevant to LED-based lamps (see discussion later in relation to FIG. 4).

Moreover, at least one end-cap 20i of the lamp 12 is used to house additional components, being components specific to the fact that the lamp 12 is a wirelessly controlled and/or LED-based replacement for a more traditional lamp such as a fluorescent tube or filament bulb. These additional components comprise a rectifier 23 and LED driver 24 for converting the power supplied by the ballast 10 (designed for powering a conventional lamp such as a fluorescent tube) into power suitable for driving an LED-based lighting element 18. The rectifier 23 is connected to the connector(s) 22i, 22ii of the lamp 12, for receiving the AC power supplied by the ballast 10 and converting it to DC. The LED driver 24 is connected to the rectifier 23 and arranged to further convert this into an approximately constant (but in embodiments adjustable) current supply for powering the LED-based lighting element 18 (e.g. LED string), and thereby cause a desired light output to be emitted from the lighting element 18. N.B. if the power supplied by the luminaire's power supply circuit 10 is already DC, the rectifier 23 is not needed, but typically in the scenario of a retrofittable LED-based lamp, the power from the luminaire's own power supply circuit (e.g. ballast) 10 will indeed be AC and therefore need rectifying.

Further, the additional components in the end-cap 20i comprise a controller 26, and a wireless interface 28 in the form of a radio transceiver, such as a ZigBee, Wi-Fi, 802.15.4 or Bluetooth transceiver. The controller 26 may be implemented in software stored in an embedded memory of the lamp 12 and run on an embedded processing device 46 of the lamp 12, or the controller 26 may be implemented in dedicated hardware circuitry, or configurable or reconfigurable hardware circuitry such as a PGA or FPGA. In embodiments the controller is implemented in a combination of software and dedicated hardware M1 (see FIG. 7, to be discussed in more detail later).

In embodiments, to aid installation for best communication between lamps 12 within a luminaire 4, the end-cap 20i housing the additional components may be marked with a physical (e.g. visible) mark or marks. For instance, a physical mark may be provided at the end where the radio is, and the installer may be instructed to group the marks within a luminaire. Alternatively colour coding could be used, with a mark of one colour at one end 20i and a mark of another colour at the other end 20ii. E.g. a red dot on one cap (and optionally a blue dot on the other cap), and instructions may be provided that caps of the same colour go together.

The controller 26 is connected to the wireless interface 28 and the LED driver 24. The controller 26 is configured (e.g. programmed) to use the wireless interface 28 to receive lighting control commands from a manual or automated lighting controller (not shown), such as a dedicated remote control device, a wireless wall switch or wall panel, or a lighting control application running on a user terminal like a smartphone, tablet, laptop computer or desktop computer. In response, the controller 26 then controls the driver 24 in order to control the light output of the lighting element 18 in accordance with the received control command. For example this may comprise turning the light on or off, dimming the light output up or down, changing the colour of the light output, or creating a dynamic (time-varying) lighting effect. E.g. the controller 26 can adjust the current level supplied to the LEDs in the lighting element 18 in order to dim the light output, and/or can adjust the current level supplied to differently coloured ones or subarrays of the LEDs in the lighting element 18 in order to adjust the overall colour of the light output.

Alternatively or additionally, in a distributed system, each of the luminaires 4 may comprise one or more sensors such as an ambient light sensor and/or occupancy sensor (not shown), and/or one or more wireless sensors may be placed elsewhere in the environment 2. In this case the controller 26 may be configured to use the wireless interface 28 to receive sensor readings from one or more of the sensors, e.g. in the same luminaire 4 and/or a neighbouring luminaire 4. In response, the controller 26 can then control the light output of the lighting element 18 in accordance with the sensor reading(s), e.g. to dim down or turn off the lights when a sensor on detects that the ambient light level is beyond a threshold or that no occupant is present within a predetermined vicinity, or to dim up or turn on the lights when a sensor detects that the ambient light level is below a threshold or that an occupant is present in the vicinity (or more generally the control may be based on a more complex distributed control algorithm that computes an adjustment based on the sensor readings from multiple sensors).

In further embodiments, the controller 26 may also be configured to use the wireless interface 28 to send status reports to the lighting controller (not shown), e.g. to report burning hours to date, to report an operating temperature of the lamp, and/or to report a fault.

However, to be able to perform the various activities discussed above, or such like, this first requires the lamps 12 to be commissioned. That is, the lamps 12 need to be identified and joined to a wireless network such as a ZigBee, Wi-Fi, 802.15.4 or Bluetooth network. This wireless network then provides the means by which the wireless interface 28 on each lamp 12 can subsequently, in the operational phase, receive lighting control commands from the lighting controller (not shown), receive sensor readings from the sensor(s), and/or send status reports to the lighting controller. The following will be described in terms of ZigBee, but it will be appreciated that this is not necessarily limiting.

In accordance with embodiments disclosed herein, the controller 26 is configured to participate in a commissioning process prior to the operational phase. The commissioning involves one or more of the lamps 12 interacting with a commissioning tool 6 used by a user 8 who is performing the commissioning. The commissioning tool 6 may take any suitable form, such as a dedicated remote unit, or a commissioning application running on a user terminal such as a smartphone, tablet or laptop computer. Note that the commissioning tool is typically not the same device as the lighting controller (not shown) which subsequently controls the lamps 12 in the operational phase, though that possibility is not excluded either.

The user 8 uses the commissioning tool 6 to at least instigate the commissioning of each of the luminaires 4 he or she wishes to pull into the control network, though in accordance with embodiments herein some or all of the rest of the process may then proceed in an automated fashion between the lamps 12 and the commissioning tool 6.

The controller 26 on each lamp 12 is configured to be able to operate its respective lamp 12 in either a factory new (FN) mode or a non factory new (non-FN) mode, and to switch between these modes. For example these may be the FN and non-FN modes of the ZigBee Light Link protocol. In the FN mode, the lamp 12 appears to the commissioning tool 6 as awaiting commissioning. For instance, this may be achieved by the controller 26 using its respective wireless interface 28 to repeatedly (e.g. periodically) emit beacons advertising that the respective lamp 12 is awaiting commissioning. Alternatively, this may be achieved by the controller 26 setting itself to respond to queries broadcast from the tool 6 to respond that the lamp 12 is awaiting commissioning. In the non-FN mode, the lamp 12 does not. For example, the controller 26 does not emit any beacons, or at least does not emit beacons advertising the lamp 12 as awaiting commissioning (e.g. it could stop emitting certain beacons, or change the content of its beacons so as not to state that the respective lamp is awaiting commissioning). Alternatively, the controller 26 may set itself to a mode in which it does not respond to the queries broadcast from the tool 6, or responds with a response that the lamp 12 is awaiting commissioning.

Thus when a lamp 12 is in the FN mode, the commissioning tool 6 will detect the lamp 12 as awaiting commissioning and display it as such to the user 8 through a user interface of the commissioning tool 6. In the non-FN mode on the other hand, the commissioning tool 6 will not see the lamp 12 as awaiting commissioning and hence will not display it as such to the user 8 through the user interface of the commissioning tool 6.

In embodiments, awaiting commissioning means at least awaiting being joined to a wireless network (e.g. ZigBee network) for the purposes of subsequent control in the operational phase. Hence in embodiments the controller 26 on each lamp 12 is configured to emit the above-described beacons when in the FN mode, but to stop emitting said beacons when in the non-FN mode, or in alternative embodiments to change the way it responds to queries broadcast from the commissioning tool searching for lamps 12 awaiting commissioning. By way of illustration, the following examples may be described in terms of the former implementation, where the FN mode controls whether or not the respective lamp 12 emits beacons (or at least whether it emits a certain type of beacon advertising it is waiting commissioning). In the latter implementation, if the commissioning tool 6 sends out an offer for an open network, the controller 26 of a master lamp will react to the offer but the slave lamp will ignore it.

Another property exploited by embodiments herein, is that a lamp configured according to a ZigBee standard such as the ZigBee Light Link standard will automatically switch from the FN mode to the non-FN mode when it joins a ZigBee network. Therefore according to embodiments herein, causing a lamp to join and leave a temporary network can be used to artificially manipulate the FN mode.

In accordance with exemplary techniques disclosed herein, the controller 26 on each of the lamps 12 is configured to obey a distributed master-slave protocol whereby it determines in a distributed fashion (without involving coordination by a centralized controller) whether it is itself to become a master or a slave for the purpose of the commissioning. The protocol is arranged such that one and only one lamp 12a per luminaire 4 will become master, and all the other lamps 12b, 12c, 12d in that same luminaire 14 will be slaves to the respective master 12a (N.B. the lamp labelled 12a is described herein as the master just by way of example—in general the master could be any of the lamps 12a-d in the same luminaire 4). Techniques for detecting which lamps 12a-d are within the same luminaire will be discussed in more detail later.

The controller 26 of the lamp 12a that becomes master then artificially manipulates the FN mode of its slaves 12b-d so as to hide all but the master 12a from being shown to the user 8 in the user interface of the commissioning tool 6. This is achieved by having the master 12a cause the slave lamps 12b-d to join a temporary wireless (e.g. ZigBee) network created by the master. Further, the controller 26 of the master lamp 12a performs one or more commissioning operations on behalf of itself and its slaves 12b-12d as a group. Thus from the user's perspective, the commissioning is only performed for each luminaire 4, not each individual lamp 12, with the commissioning involved in reporting the identifiers of the slaves 12b-12d to the commissioning tool 6 and joining the slaves into a network being performed entirely "behind the scenes".

The following describes an exemplary work flow for a situation in which, before the start of the auto-grouping, all TLED tubes 12a-d within the luminaire 4 are newly installed, i.e. Factory New (FN). This is illustrated by way of example for a room with N fixtures 4 each having four TLED tubes 12a-12d, being commissioned into a ZigBee network. Where it is described in the following that a lamp 12 performs a certain operation, it may be assumed that this is performed under the control of its respective controller 26, using the respective wireless interface 28 where appropriate.

Firstly, four times N factory new (FN) TLED tubes 12 are inserted into N luminaire fixtures 4 respectively. Initially, each FN TLED 12 detects no ZigBee network (or only a network or networks with below a threshold received strength, which it can assume must be from another luminaire or even another room—see the "bucketing" feature described later).

Every TLED 12 in the environment 2 then starts a new ZigbBee network, beginning in the FN mode (note: no bridge or remote control commissioning device 6 need present within the system at that time). This means each lamp 12 in the environment 2 transmits beacons communicating the fact that it is a new lamp searching for neighbours. These beacons include a unique identifier number (e.g. the 64 bit ZigBee address of the TLED). All TLEDs 12 also listen for these beacons, and analyse the addresses of the other TLEDs 12 versus their own address. The single TLED 12a with the lowest address starts the second phase of the auto-commissioning by modulating its 64 bit ZigBee address onto the ballast line connecting it to the ballast 10, by modulating the load it places on the ballast (to be discussed in more detail later). All other TLEDs 12 check if the power they received from the ballast 10 is being modulated. If so, these TLEDs 12b-d each grab the 64 bit address which it has received via the ballast load modulation. This 64 bit address is the ZigBee address of the master TLED 12a in its own luminaire 4. Note, the lamps 12 may not all turn on and begin the process at exactly the same time. Legally speaking the power of the luminaire 4 should be off during re-lamping, so if this rule is followed the lamps will all be turned on together after re-lamping and hence begin the process at the same time. In practice this rule is not always followed, but nonetheless, as long as the lamps 4 are configured to continue searching for potential masters or slaves for a certain finite window after power-up, the described process will still work.

An alternative approach for selecting a master would be to use a random timeout after powering-up the mains 16, before which each TLED 12 is allowed to start up its radio 28. The TLED 12 on which the radio 28 is first active becomes the master and starts up the network. The random timeout feature of the TLED tube 12 is disabled after a certain time period, e.g. one month, if the TLED 12 is still un-commissioned. This random timeout approach is however less preferred: the process costs time, and in addition it is hard to dimension for both small and large networks (the larger the network, the longer the required start-up delay will be). Whereas the load modulation works directly, and for any network size.

By whatever means the master and slaves are chosen, each of the slave TLEDs 12b-d subsequently joins the ZigBee network of the ZigBee master TLED device 12a (causing each of the slaves to switch to the non-FN mode and stop beaconing). The master TLED 12a notices one or more TLEDs 12b-d have joined its network. This network is used by the master 12a to obtain unique numbers (e.g. 6-digit remote reset codes) from its slaves 12b-d, wherein these are used later on during the commissioning process to pull the slave TLEDs 12b-d into the ZigBee network set up by the installer remote (commissioning tool) 6.

After it has been determined which of the TLEDs 12 are located in the same luminaire 4, the master TLED 12a saves the unique address of its slave TLED neighbours 12b-12d, along with network parameters and keys. The master TLED 12a exits the network it created for its slaves 12b-d and goes back to the FN mode so as to show up to the commissioning tool 6 as awaiting commissioning. However, it leaves its slave TLEDs 12b-d in this newly created network, so that they will not show up to the commissioning tool 6. Hence the master 12a acts as the representative of its slaves 12b-d.

As the master 12a has returned to the FN mode, this means it will start beaconing again. To avoid it being taken into account in the distributed protocol for selecting the next master, it therefore indicates in one or more of its beacons that it has already acted as master.

Regarding the beaconing generally, the TLEDs 12 require a mechanism to communicate some unique ID, their presence, and whether they have already been grouped per luminaire 4. Normal ZigBee beacons contain amongst other things the extended PAN ID of their network, but do not provide space or mechanism to include other information that the TLEDs 12 may need to exchange. Therefore, one of the following alternative methods may be used to indicate whether a master 12a returning to the FN mode has already been a master (has already grouped the lamps 12b-12d in its respective luminaire.

A first possibility is to use privately defined announcement messages over ZigBee. According to this approach, each lamp 12 starts its own ZigBee network without being open for other devices to join that network. At one or more times throughout the commissioning process (as the initial beaconing and/or later), each TLED 12 regularly (at some predefined interval) sends on its own network an inter-PAN announcement message containing information relevant for the present purpose (e.g. MAC address, indication of being master vs. slave TLED within a luminaire, whether or not auto-grouping with slave TLEDs in the luminaire already happened). For the rest of the time, it listens on either its own channel or all channels (see note below) for similar messages from other TLEDs 12. Each factory new TLED listens to all such messages within its radio range, and acts accordingly (see rest of text). If a TLED 12 has already performed the auto-grouping, it adjusts the contents of its announcement message accordingly. After commissioning is complete, sending the announcement messages may be continued for use cases such as replacing one of the TLEDs (discussed in more detail later).

The above could be performed with all TLEDs 12 on a ZigBee channel known to them all (easiest since devices need to listen only on one channel), or each TLED could choose on a random ZigBee channel (which means each device needs to listen on all channels—somewhat more involved but allows a good spread over all ZigBee channels).

A second possibility is to use modified beacons. This is similar to the first possibility above, but instead of the announcement messages using a beacon as defined in a ZigBee spec, the protocol byte is set to a value different from the values used for existing systems (00=ZigBee Pro, etc.) In the payload, the various information (same as described in relation to the first possibility above) is carried.

A third possibility is to use alternative type of beacons other than ZigBee beacons, of another protocol other than ZigBee. This is a variation on the first and second possibilities above, but the information in question is transmitted in the alternative beacons, e.g. BLE (Bluetooth Low Energy) iBeacons.

By whatever means the first master 12a indicates it has already been a master, other TLEDs 12 in other luminaires 4 which are not yet auto-grouped then notice they no longer received beacons from the master TLED 12a in the first luminaire without this indication being given. This means another TLED 12 will now have the lowest unique number, assign itself the master role for its luminaire 4 and repeat the above process for this luminaire. The whole process repeats until a respective master TLED 12 in every luminaire 4 has completed these steps.

Note: optionally, the process flow described above may be augmented by using a measure of the received signal strength of the beacons, e.g. a received signal strength indicator (RSSI), in order to help select tube neighbours 12b-12d within the luminaire 4 by detecting those having a high enough signal strength. That is, the RSSI can be used to speed up the TLED auto-commissioning process. Beacons with an RSSI below a predetermined threshold can be ignored so that multiple luminaires 4 (e.g. in a large open-plan office) can run the above auto-grouping process at the same time, independently verifying which TLEDs 12 are indeed housed within the same luminaires 4. RSSI alone is not necessarily reliable enough for identifying the TLEDs 12 residing within the same luminaire 4 with sufficient certainty. Hence, in embodiments the RSSI is only used to create RSSI-based buckets of TLEDs 12 (i.e. candidate subsets), e.g. those that are likely to be in the same luminaires, or those that might be in the same luminaire. Based on the buckets, a second identification mechanism is then used—for instance shorting the electric load of one master TLED 12a and detecting the ballast load change at another slave TLED 12b-d within the luminaire—to more reliably determine which TLEDs 12 are indeed housed within the same luminaires 4.

In the next phase of the commissioning flow, the installing user (person) 8 gets involved in the commissioning. The installing user 8 sees on his commissioning tool 6 only one FN lamp 12 displayed per luminaire 4 (i.e. the master TLED). If the user 8 wishes to include the luminaire 4 of one of these visible, FN lamps 12a in the network he or she is creating, then he or she selects that lamp 12a in the user interface of the commissioning tool 6. This causes the commissioning tool 6 to send a commissioning request to the selected lamp 12a. In response, this lamp 12a provides a visual indication to the user 8, e.g. by flashing its lighting element 18. The user 8 can thus see that the lamp 12a that he or she selected is indeed in the luminaire 4 that he or she intends to commission. If so, the user confirms this via the user interface of the commissioning tool 6, causing the commissioning tool 6 to include the master TLED into its ZigBee network (i.e. the wider ZigBee network being created for the purpose of controlling the lamps 12 in the subsequent operational phase). The master TLED 12a also tells the commissioning tool 6 about its three non-FN TLED slaves 12b-d (including their unique IDs, e.g. ZigBee addresses). The slave TLEDs 12b-d then join the ZigBee network set up by the commissioning tool (or a lighting bridge). There are at least three options for this.

A first option is for the commissioning tool 6 to use the slave TLEDs' unique IDs to pull the slave lamps 12b-d into its network using 6-digit reset codes. These can be broadcast by the commissioning tool 6 to make the slave TLEDs 12b-d become FN again and join the commissioning tool's remote network.

As a second option, the master TLED 12a temporarily goes back to the old network (the network it created with its slaves 12b-d) and uses this to transmit to its slave TLEDs 12b-d the parameters of the new network (the network being created by the commissioning tool 6). The slave TLED tubes 12b-d then switch to the new network, and the master TLED tube 12a also goes back to the new network of the commissioning tool 6.

In a third option, the commissioning tool 6 instructs the master TLED 12a to send a "remote reset" to its slave TLEDs 12b-d. The master TLED 12a temporarily goes back to the old network and transmits a "remote reset" to its slave TLEDs 12b-d, causing the slave TLEDs 12b-d to become FN again. The master TLED tube 12a then goes back to the network of the commissioning tool 6. The commissioning tool 6 searches for new devices and finds the three slave TLEDs 12b-d.

Thus the master and slave lamps 12a-d are all collectively pulled into a wireless network (e.g. ZigBee network) created by the commissioning tool 6, so that the lamps 12a-12 can subsequently be controlled via that network in the operational phase. Whatever option is used, preferably the commissioning tool 6 also assigns a group address (e.g. ZigBee group address) to the lamps 12a-12d in the same luminaire 4 (allocating a different respective group address to each respective luminaire). This group address then allows the controlling device (not shown) to control the lamps 12a-d together by broadcasting one or more control messages each with only a single group address as the destination address (rather than transmitting a separate message to an individual address of each lamp). For example, according to ZigBee messages can be broadcast with a group identifier, whereby only lamps 12 containing this identifier (i.e. being in this group) will react. When assigned, the commissioning tool 6 communicates the group address to the master 12a and each of the slaves. In the operation, each lamps 12a-12d then listens for any messages with the group address, and reacts accordingly. Note however that having a group address for all TLEDs within a luminaire is not necessarily required. Alternatively, once the commissioning process is finished, it is possible to simply address each TLED by its own individual address.

The above thus describes a mechanism by which an arrangement of newly installed luminaires 4 can be commissioned. A further situation in which the auto-grouping may be used is when one of the individual TLEDs 12 in a given luminaire 4 is replaced, at a later time after the initial commissioning phase is over and the operational phase has begun. The following describes a work flow for the replacement of one of the non-FN TLEDs tubes 12 in a luminaire 4. This connected TLED field-replacement aims at "out-of-the box" auto-commissioning of a replacement TLED 12 without involvement of a remote control or a commissioning expert. The auto-grouping process can be triggered by the combination of a factory new connected TLED tube 12 and power-cycling of the mains voltage 16 once via a switch. Alternatively, the re-lamping person may actively trigger the auto-commissioning for the replacement tube (e.g. five times mains-switch toggling within 10 sec).

The auto-commissioning of the replacement TLED proceeds as follows. The newly installed TLED, e.g. a replacement for 12b, sends a signal to the ballast 10, by modulating the load it places on the ballast 10. Other TLEDs 12a, 12c, 12d in the same luminaire 4 hear this message in the power supplied to them by the ballast 10. One of these TLEDs 12a, 12c, 12d opens its network (e.g. the one with the lowest unique address, or the TLED 12a which already became the master of the luminaire 4). The new TLED then joins the network. The master TLED 12a programs the appropriate ZigBee groups in the new TLED so it functions in the same way as the replaced TLED 12b.

This assumes that the commissioning tool 6 has allocated all TLEDs 12a-d in a luminaire 4 to a single ZigBee group. Having all TLEDs 12a-d within a luminaire 4 in the same group is very advantageous for this replacement use case, as then the Zigbee group number of the remaining old TLEDs 12a, 12c, 12d can be directly re-used for the new replacement TLED. Unlike Zigbee group addresses, normal ZigBee addresses do not have this characteristic: the new replacement TLED would always have a different 16-bit address than the old one.

The above mechanism may include a timeout in case no-one answers the request. Or as an alternative, the new TLED may send a request for a network over ZigBee, which is monitored by the other TLED(s) 12a, 12c, 12d—or at least the master 12a of the luminaire 4—and answered. Also here, signaling via the ballast line can be (and preferably is) used to verify that both are in the same luminaire 4. For TLED field replacement, this verification as to whether an "aspirant" wireless node wanting to join the lighting network is indeed connected to a fluorescent tube ballast 10 also serves as a security mechanism—it can only join if it is physically in the same luminaire 4 as an existing member 12a of the network, thus avoiding rogue devices joining for malicious purposes such as in an attempt to disrupt the lighting. Sharing the same fluorescent tube ballast 10 is in several ways the TLED market analogy to the touchlinking mechanism used for consumer applications. In consumer applications, the pairing procedure requires physical proximity for remote controls with the bulbs to prevent pairing of malicious new network components to the lamps e.g. from outside of the housing 14. In the same way, embodiments of the present disclosure enable an existing lamp 12a to assess the authorization of the new ZigBee component to join the network, by verifying that the new wireless component purporting to be a TLED is indeed wired on the same ballast 10 as the existing connected TLED 12a and hence indeed is a replacement TLED and not another malicious wireless device.

Figure 9:
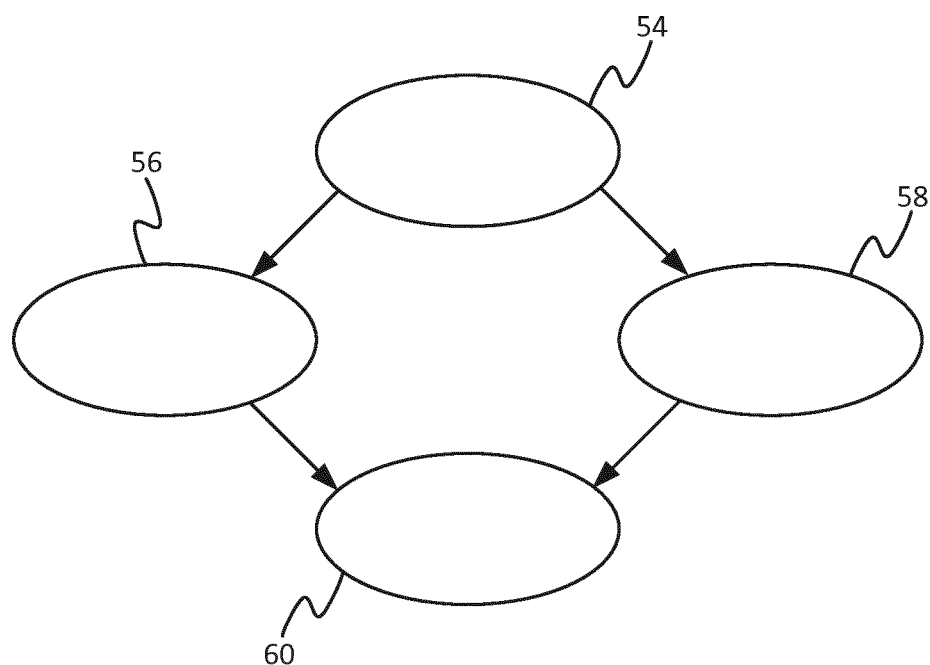
FIG. 9 is a schematic state diagram of a lamp.

To summarise the above, FIG. 9 gives a state diagram showing the different possible states of a lamp 12 in accordance with embodiments of the present disclosure. Every lamp begins life, when powered up for first the first time, in an "out of the box" state 54 where it performs the distributed negotiation protocol to determine whether to become a master or slave, as discussed above. Then, based on this, one of the lamps 12a transitions to the master state 56 while the others of the lamps in the same luminaire each transition to the slave state 58. While the first lamp 12a is in the master state 56 and the second lamp 12b-d are in the slave state 58, the master 12a interacts with the commissioning tool on behalf of the first and second lamps 12a-d collectively, in order to initiate one or more steps to commission those lamps 12a-d as a group. Finally, after commissioning is over, both the master and slave lamps 12a-12d transition to the operational state (operational phase) 60 where they are usable for their ultimate purpose, i.e. to be used to illuminate the environment 2, and be controlled via the ZigBee network or other such wireless network established by the commissioning tool (e.g. to be dimmed, used to set colour lighting scenes, etc.). In the operational state 60, each lamp 12 monitors for signals for potential replacement lamps as discussed above.

Note that whether (a) the lamp is FN ("Factory New") mode is a separate variable than whether (b) it is in the "out of the box", master, slave, or in the final operational state. This can be seen by considering that while a lamp is master, it switches between both FN and non-FN, and also while a lamp is a slave it can also switch between FN and non-FN—so (a) and (b) are separately controllable factors. Thus techniques disclosed herein involve deliberately and artificially manipulating the FN state so that it does not just indicate whether newly "out of the box", but is used for an extra purpose of controlling which of multiple lamps 12 in the same luminaire 4 appear to the commissioning tool 6.

The use of load-modulation to signal via the ballast may be particularly advantageous compared to RSSI-only-based auto-grouping. In the USA for instance, luminaires always have a continuous metal enclosure for both the upper top and the sidewalls of the luminaire 4. The metal side-walls of the luminaire block the direct wireless path (in the same plane) between the TLEDs 12 being housed in different luminaires 4. Consequently, the wireless attenuation between TLEDs 12 housed in two different luminaires 4 is typically stronger than for two adjacent TLEDs at 15-20 cm distance housed within the same luminaire 4. However, for smaller than usual installation distance between adjacent luminaires 4, the attenuation caused by the luminaire metal sidewalls will be under certain cases insufficient to prevent accidental auto-grouping of connected TLED tubes 12 from different luminaires (e.g. if a punch-out hole in metal sidewall of luminaire is located right next to the TLED's radios 28). In addition, each of the TLED tubes 12 may have its radio 28 located in only one of the end-caps 20i of the tube 12. Hence, there will be a 50% likelihood that two neighbouring TLED tubes 12a, 12b located within the same luminaire 4 will be mounted by the installer with the radio 28 at opposite ends of the tubes 12. Placing the antenna 28 in the middle of the TLED may overcome this problem. However, from a TLED hardware perspective, the preferred radio location in a connected TLED is within the end cap 20.

To ensure sufficient robustness, it is therefore preferable to "bucket" the TLEDs 12 with the help of RSSI, and then use a second grouping method to determine with certainty which TLEDs 12 are located within the same luminaire 4.

There are at least two options for the second auto-grouping method. One embodiment, as mentioned above, is that the master TLED 12a tube signals via the ballast 10 by modulating the load it places on the ballast 10 (e.g. to signal its unique ID). The other TLEDs 12b-d are then looking to detect the load transitions caused by their sister TLEDs within the same luminaire 4. This will be discussed in more detail shortly.

As an alternative embodiment however, each of the connected TLEDs 12 may have an integrated light sensor which can be used to allow the slaves 12b-d to detect a light modulation pattern emitted by the master TLED 12a located within same luminaire 4 (and/or the slaves 12b-d could emit a light pattern to be detected by the master 12a). The light sensor may be a pre-existing daylight sensor, or a dedicated light sensor for the purpose of the disclosed detection. The master 12a will selectively switch off the light within the luminaire 4 to aid the master TLED tube to receive coded light messages from its neighbours 12b-d without disturbance from its own light. Coded light can be used to detect which lamps 12 are in the same luminaire because the housing 14 of the luminaire 4 acts to at least partially block coded light signals—so lamps 12a-d in the same luminaire 4 will receive each others' signals but not those from lamps 12 in other luminaires 4. To facilitate this, the light sensors and/or positions of the lamps 12 may be specifically arranged so that the light sensor of a given lamp 12 in a given luminaire 4 only, or at least predominantly, receives light from lamps in the same luminaire 4. E.g. the light sensor may be arranged to face upwards to detect the light reflected from an upper reflective element in the interior of the respective luminaire housing 14. A similar principle could even be applied using other media as the means by which to detect whether lamps 12 are in the same luminaire: e.g. each lamp 12 may emit an ultrasound signal that is blocked by the housing 14, or each lamp 12 may emit a radio signal which is blocked by metal elements around the sides of the luminaire housing 14 (such that signals can be received from a controller or commissioning tool 6 below the luminaire 4, but not from other luminaires mounted on the same ceiling).

As an additional feature, in embodiments, by using the light sensor per TLED 12 it is possible to identify the relative positioning of the TLED tubes 12a-d within the luminaire 4. This enables directional lighting sweeps across the four TLEDs 12a-d within the luminaire 4 (from left to right, or from right to left). This dynamic swiveling light beam may make it possible to identify the directionality among neighboring luminaires 4, which may enable auto-commissioning at room level In this approach, the TLEDs 12 housed within the same luminaire 4 sequentially switch on their light from left side to right side of the luminaire. At the same time, the LEDs of the TLEDs in the neighbouring luminaires remain switched off, but detect with a light sensing means the light lux level on the floor caused during the sequential switching on of the TLED tubes within the neighbouring luminaires. The physically closer the lighted-up TLED tube is to the receiving TLED, the more light will be on the floor. Based on the detected the lux level on the floor during the step-wise switching of the tubes, the TLED tube (in light off mode) can deduce whether the neighbouring luminaire performing the sweeping light is actually located on its right or its left side The following now describes an exemplary implementation of the technique for intentionally modulating the load placed on the ballast 10 by the master 12a, in order to signal a pattern in the power supplied by the ballast 10 to the lamps 12a-d in the same luminaire 4.

Figure 4:
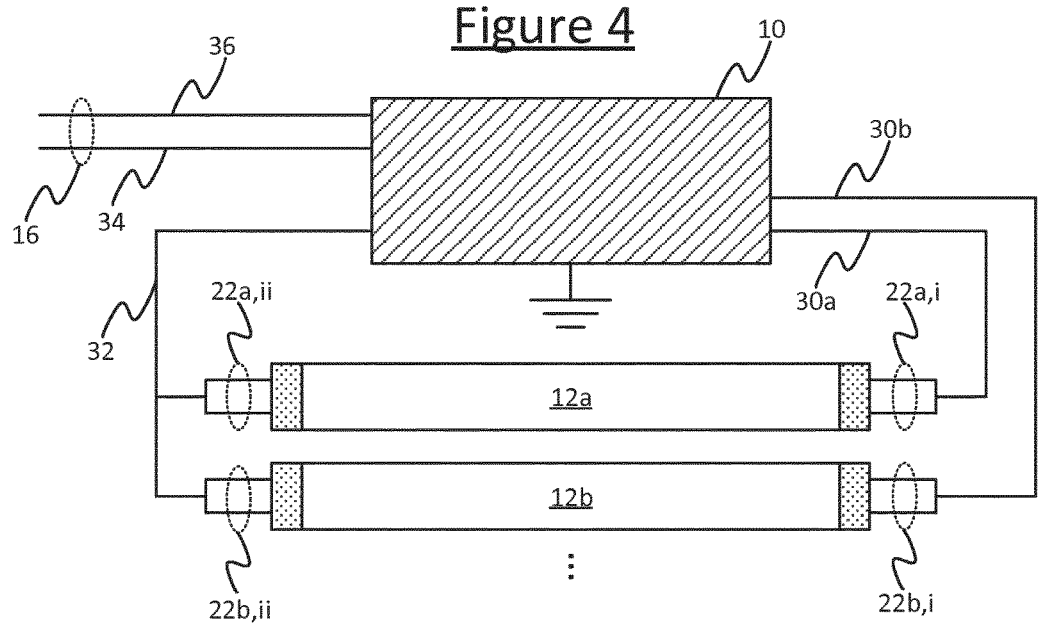
FIG. 4 is a schematic wiring diagram for a luminaire comprising a plurality of lamps.

As discussed, a fluorescent luminaire 4 typically takes several TL tubes 12a-d wired to one single ballast 10. A typical wiring diagram for an instant start (IS) ballast 10 is shown in FIG. 4. At each end of the TL tube 12, the two pins 22 are shorted by a shunted lamp holder. The pins 22a,i at one end of a first of the lamps 12a in the luminaire 4 are connected to the ballast 10 via a first blue line 30a, and the pins 22b,i at one end of a second of the lamps 12b are connected to the ballast 10 by a second blue line 30a (and so forth if there are more than two lamps in the luminaire).

At the other end, the pins 22a,ii and 22b,ii (etc.) are all connected together and connected to the ballast 10 via the same red line 32. The ballast 10 itself is connected to the mains 16 via the black line 34 and white line 36.

Figure 5:
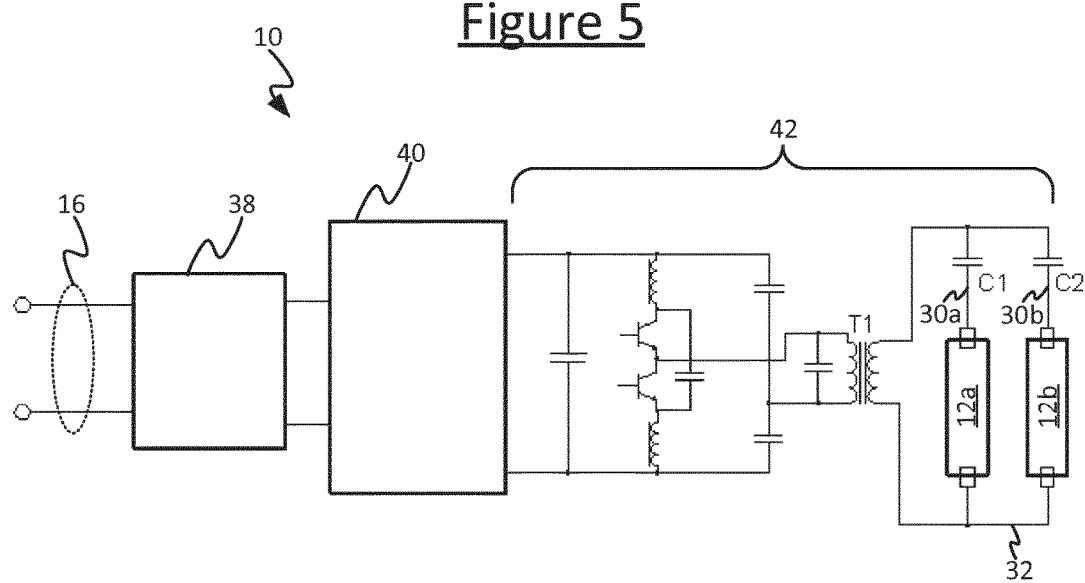
FIG. 5 is a schematic circuit diagram of a ballast.
Figure 6:
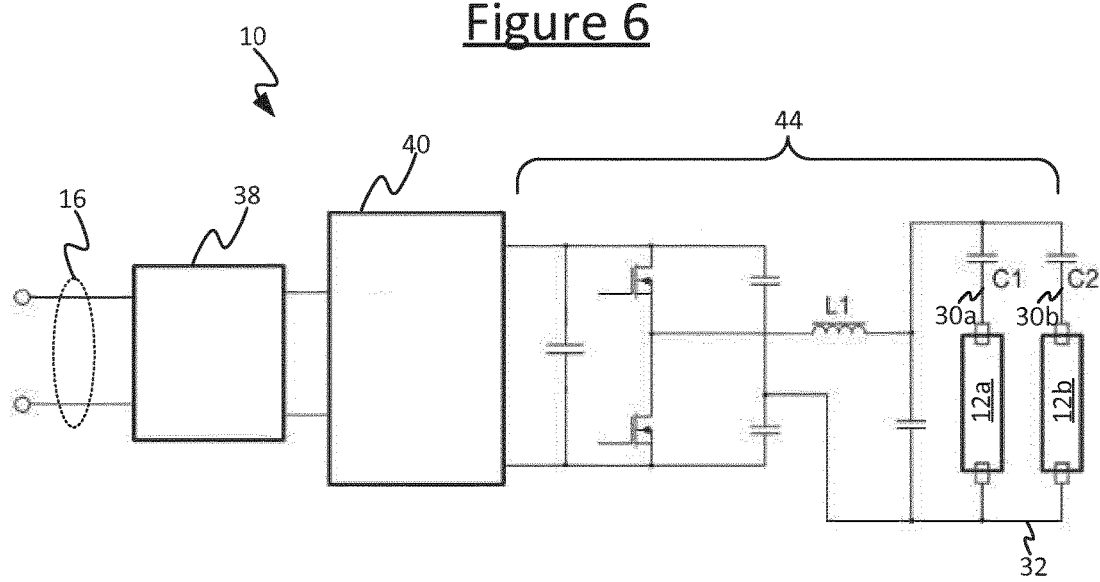
FIG. 6 is a schematic circuit diagram of another ballast.

FIGS. 5 and 6 show examples of different types of ballast 10 for powering fluorescent tubes. By way of example, these are the dominant topologies in NAM regions for Instant Start (IS) ballasts, namely the self-oscillating (SO) circuit (see FIG. 5) and current-fed half-bridge resonant circuit (see FIG. 6).

FIG. 5 shows a typical High Frequency (HF) fluorescent ballast. This ballast 10 consists of an EMI (electromagnetic interference) filter 38 arranged to receive the upstream mains power supply 16, and to filter this to produce a filtered power supply and to block the interference generated by the ballast back to the mains. The ballast 10 also comprises a PFC (power factor correction) input stage 40 connected to receive the filtered power supply from the EMI filter 38, and to perform a power factor correction on the filtered power supply in order to produce a power factor corrected power supply. The circuit further comprises a resonant output stage 42 connected to receive the power factor corrected power supply from the power factor correction stage 40. This circuit works in self-oscillating mode in order to generate, based on the received power factor corrected power supply, the final power supply as used to power the fluorescent tubes (or their TLED replacements 12). The two transistors in the resonant circuit 42 are driven by the auxiliary winding of the transformer T1. The output is typically isolated from the mains 16. The ballast 10 thus generates a HF voltage of about 600V across the secondary winding of T1. Capacitors C1 and C2 are connected in series with each of the lamps 12a, 12b respectively. The capacitors C1, C2 act as a ballasting element and control the lamp current.

In recent products, the half-bridge (HB) resonant circuit has become more popular due to its cost saving. A typical HB fluorescent ballast topology is shown in FIG. 6. This circuit is similar to that of FIG. 5, but with the SO resonant circuit 42 replaced with a HB circuit 44. The HB circuit 44 is typically controlled by an integrated circuit (IC). The output is not isolated from the mains 16.

Figure 7:
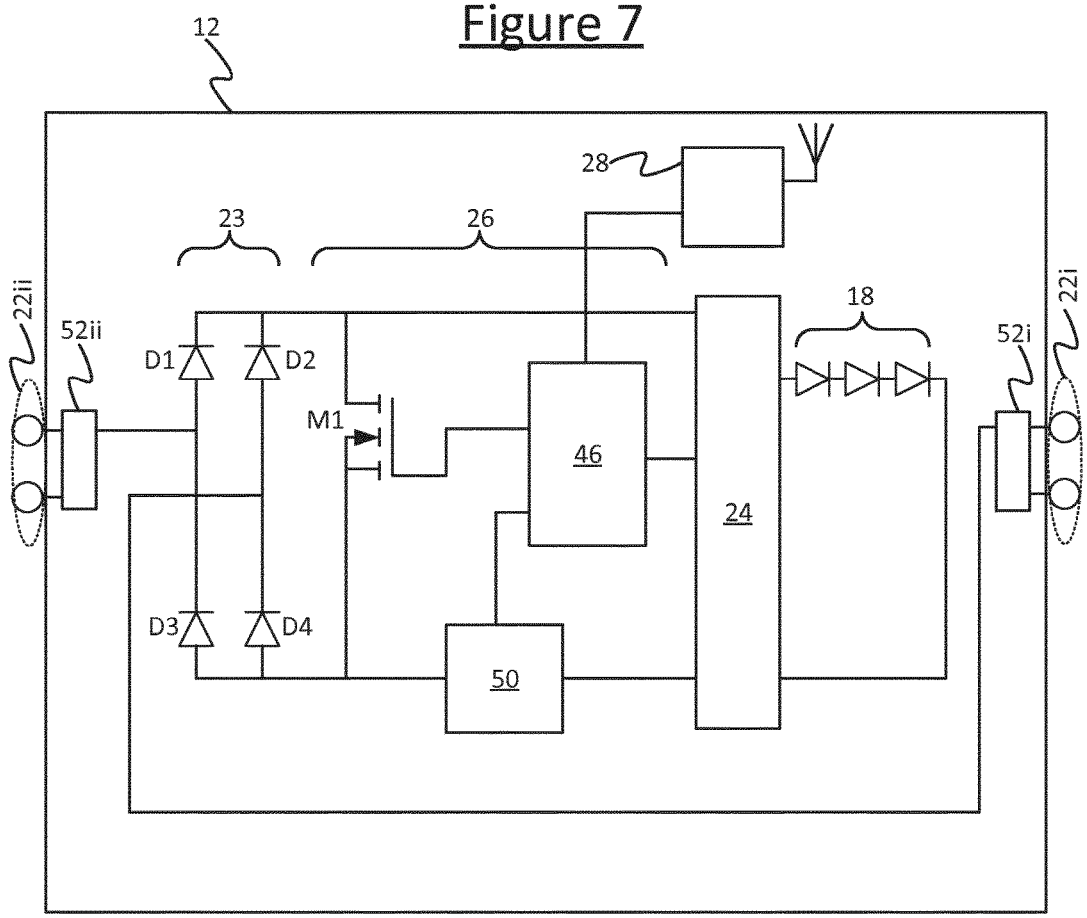
FIG. 7 is a schematic circuit diagram of a lamp.

Details of some exemplary techniques for transmitting and receiving a signal via ballasts 10 such as those shown in FIGS. 5 and 6, or others, are now described in more detail in relation to FIG. 7.

FIG. 7 shows an example lamp 12 for performing load modulation in order to signal via the ballast 10, and also to detect such signals from other lamps 12 via the power supply received from the ballast 10. In embodiments, each of the lamps 12 in one, some or all of the luminaires 4 may be configured in accordance with FIG. 7.

As shown in FIG. 7, the lamp 12 comprise a rectifier 23 comprising an arrangement of diodes D1, D2, D3, D4 arranged to receive an AC power supply from the ballast 10 via the pins 22 of the lamp 12, and to convert this to DC power. Various forms of rectifier are in themselves known to a person skilled in the art and the rectifier 23 does not necessarily have to take the form shown in FIG. 7 (though it may well do). The lamp 12 further comprises an LED driver 24 arranged to receive the DC power from the rectifier 23, and based on this to generate a constant or approximately constant current to the LED-based lighting element 18 (LED string or array). Note however that a constant current, as referred to herein, does not necessarily mean the current is not adjustable. Rather, the lamp 24 comprises a controller 26, e.g. comprising a microcontroller 46 arranged to execute embedded firmware of the lamp 12. Further, the lamp 12 comprises a wireless interface 28, e.g. ZigBee, Wi-Fi, 802.15.4 or Bluetooth interface (the above has been described primarily in terms of the ZigBee example). The microcontroller 46 is connected to the wireless interface 28 and to the LED driver 24. It is arranged to receive messages via the wireless interface 28, e.g. originating from a lighting controller or one or more wireless sensors (not shown), and based thereon to determine a light output level with which the lighting element 18 is to emit light. The microcontroller 46 then indicates this light output level to the LED driver 24, and in response the LED driver 24 sets the current to the appropriate level to achieve the desired light output. The current supplied by the LED driver 24 is therefore constant in that for a given light output indicated by the controller 26, the LED driver 24 ensures that the current is approximately constant. Also, note that in the case where pulse width modulation (PWM) dimming or such like is used, the constant current refers to the average current. Further, in embodiments, the LED-based lighting element 28 may comprise differently coloured, independently controllable LEDs or subarrays of LEDs. In this case the controller 26 and LED driver 24 may also individually set the output levels of each the differently-coloured LEDs or subarrays in order to control the colour of the light output.

In order to signal via the ballast 10, the internal controller 26 of the lamp 12 further comprises transmitting circuitry in the form of a transistor switch M1, connected so as to be able to modulate the load placed on the ballast 10 by the respective lamp 12, under the control of the microcontroller 46. In the example embodiment shown, this is achieved by connecting the source and drain (or collector and emitter) of the transistor M1 in parallel across the load, e.g. across the LED driver 24 or lighting element 18, with the gate (or base) of the transistor M1 being connected to the controller 26. This allows the controller 26 to selectively short out the load by controlling the gate (or base) of the transistor M1. When it does so, this causes a "hiccough" to be fed back through the ballast 10, which is detectable in the power received by the other lamps 12 in the same luminaire 4. By controlling the shorting according to a suitable, predetermined code (see below), it is thus possible to signal to other lamps 12 in the same luminaire 4 via the ballast 10.

To be able to sense such signals from other similar lamps 12 in the same luminaire 4, the lamp 12 of FIG. 7 further comprises a sensing circuit 50 connected between the rectifier 23 and LED driver 24 (though it could potentially be connected in other parts of the circuit). This circuit 50 is configured to detect the signalled pattern of "hiccoughs" in the power supplied by the ballast 10, and to supply the detected signal to the controller 26 for decoding. The sensing circuit 50 may be configured to sense the modulations in the received power by sensing modulations in the current, voltage and/or frequency of the received power. E.g. in embodiments, the sensing circuit 50 is a current sensing circuit.

Thus the controller 26 can transmit signals via the ballast 10 and also act on such signals according to the various commissioning flow steps disclosed herein, in order to perform the auto-grouping of the lamps 12*a-d* in the same luminaire 4.

To begin the TLED grouping method, one master TLED lamp 12*a* (e.g. out of a bucket of TLEDs likely sharing the same luminaire 4) initiates the auto-grouping process. During the auto-grouping process this master TLED lamp 12*a* starts the LED load shunting process, and opens and closes the switch M1 at a predefined frequency and duty cycle (as determined by the microcontroller 46). Each of the slave TLED lamps 12*b-d* senses the change in the lamp current via its internal current-detection unit 50. When the master TLED lamp 12*a* performs this coded shunting action, the loading condition of the ballast 10 changes and the ballast deviates from its normal operating point. Consequently, the remaining TLED lamps 12*b-d* in the group receive either more or less power from the ballast 10. The magnitude and direction of the change depends the fluorescent ballast topology, but in any case a change will be a noticeable to the slave TLED 12*b-d*. The slave TLED lamps sense this change by the means of the detection unit 50 inside the lamp. Because the ballast 10 is a current source, the coded shorting performed by the master TLED 12*a* lamp is a safe action and will not damage the ballast 10 or any of the TLED lamps 12*a-d*.

The load shorting functionality can be implemented at low cost within a TLED 12, e.g. with a shunt switch M1 as illustrated in FIG. 7. In each TLED 12, an instance of this shunt switch M1 is placed after the rectifier 23 (this switch M1 may in fact already be present in existing TLEDs 12 for pulse width modulation dimming purposes). When M1 closes, the lamp input is shorted and the current from the ballast 10 is bypassed without delivering power to the LED load 18. For detecting the codes sent by other TLEDs 12, an instance of the current detection block 50 is inserted into the main current loop of each TLED lamp 12. The coded changes in the ballast current and frequency are sensed via this detection block 50, and the extracted signal is fed to the on-board microcontroller 46 within the TLED 12. The same microcontroller 26 also controls the shunt switch M1.

Note that in embodiments, filament circuitry 52*i*, 52*ii* may be included at the inputs 22*i* 22*ii* on the two sides of the TLED 12 respectively, in order to emulate the filament of a real fluorescent tube lamp. This circuitry 52 may for example be a power resistor, or may be left open for instant start ballasts. The filament circuit 52 hence will pass the signalled codes without any impact on the signal.

Figure 8:
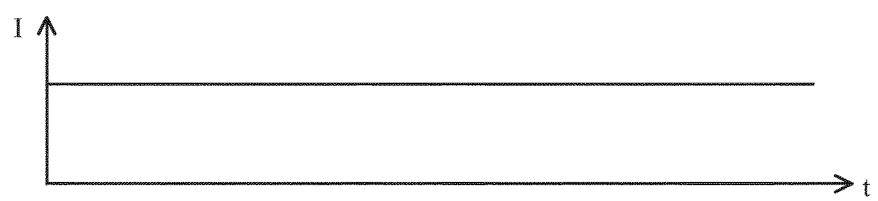
FIG. 8 is a schematic timing diagram showing a current sensed by a lamp.
Figure 8:
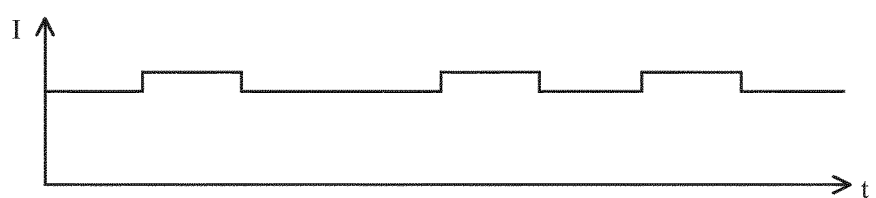

FIG. 8 illustrates an example shape of the ballast current I in the time domain t (after conditioning) as received by a slave lamp 12*b-d* according to embodiments disclosed herein. The top sketch shows the current during normal operation, whereby the ballast current received by the slave TLED 12*a-d* is at a stable level. The master TLED lamp 12*a* then starts with the grouping process and forces a coded pattern onto the ballast 10. Consequently, as illustrated in the bottom sketch of FIG. 8, the current received by the slave TLED 12*b-d* contains a modulated signal pattern with the frequency equal to the shunting frequency of the master lamp. The shunting frequency can be for instance in the 1-10 Hz range, or in the range of a few hundred Hz to a few kHz (preferably the mains frequency is avoided to minimize unwanted interference by the mains frequency components).

There are several ways for the current detection unit 50 to detect the coded modulation pattern. In a first option, the detection is done by sensing the change in the average current value. First the sensed signal is averaged via a low-pass filter. Then the value is read by the microcontroller 46 and compared to the nominal value. The microcontroller 46 then decides if this represents a signal from another lamp 12 sharing a common ballast 10 with its own respective lamp 12. E.g. each slave lamp 12*b-d* may listen on the ballast 10 for a signal from the master 12*a* identifying the master, and if the slave 12*b-d* detects this, the respective slave 12*b-d* replies to the master 12*a* via the wireless interface 28 to inform the master 12*a* of the slave's identity (e.g. address). Or operating the other way round, the master 12*a* may listen on the ballast 10 for signals received from the slaves 12*b-d* identifying themselves to the master 12*a* over the ballast 10.

As a second, alternative or additional option for the detection, the detection may be done by measuring the frequency of the received modulations. If required, the master TLED lamp 12*a* can even send some basic message to the slave lamps 12*b-d* by modulating the frequency, duty cycle, etc. This second option is more accurate than the first option above, since different ballast circuit topologies result in different modulation depths of TLED current. The average value detection method used by the first option is therefore more prone to errors than the second option (though not necessarily unusably so).

Regarding the coding scheme used to signal information via the ballast load modification scheme disclosed above, various coding schemes are possible. For instance, the ballast-based communication channel between master and slave TLEDs 12*a-d* may utilize a binary coding scheme such as Morse code, Manchester coding, or pulse position modulation, etc. The information signalled may comprise some or all the transmitting lamp's 64-bit unique ZigBee address (or other unique identifier), optionally along with some other bits such as header bits, start and stop bits, and/or possible error detection or correction bits. In certain embodiments, this communication channel may also allow for sending additional information, e.g. via the addition of a byte of "opcode". The slave lamps 12*b-d* may be enabled to acknowledge to the master 12*b-d* that they have received the signal, either back via the ballast 10 or via the wireless interface 28. After the signalling, the master 12 returns to the FN mode and engages with the commissioning tool 6 as discussed previously.

Note that the signalling over the ballast 10 could also be implemented via modulating only a portion of the luminance range (e.g. between 100% and 80% light output) rather than full 100% to 0% (light off) modulation of the LEDs 18. Similar to coded light type coding, this 100%-80% modulation may be even utilized later in the operational phase for ballast-load-change based 'side channel', which is invisible to the end user during normal lighting operation.

After completion of the auto-grouping, both the master and slave TLED lamps 12*a-d* cannot be controlled until they have been commissioned by the installer 8. There a several options as to which light levels to choose during the state where the TLEDs 12*a-d* are auto-grouped but not yet commissioned. In one embodiment, the master lamp 12*a* and slave lamps 12*b*-12*d* are automatically set at different light levels to enable a quick visual check for the (first) installer 8 as to whether the auto-pairing was done correctly.

It will be appreciated that the above embodiments have been described only by way of example.

For instance, the commissioning flow disclosed above can also be used with other protocols, not just ZigBee or ZigBee Light Link. Most fundamentally the factory new mode is a mode in which a lamp 12 appears as new to the commissioning tool 6, i.e. appears as awaiting commissioning, and the non factory new mode is one in which the lamp 12 does not appear as new to the commissioning tool 6. Other protocols may have or may be modified to incorporate a similar pair of modes, and could also benefit by using the principle of artificially manipulating the factory new mode (or the like) to jointly represent lamps 12*a-d* in the same luminaire 4 as part of the commissioning process.

Further, in the above, it has been described that the master 12*a* detects other lamps 12*b*-12*d* in the same luminaire 4 by signalling on the ballast 10, then receiving the identifiers of those other lamps back via another medium in the form of a wireless network (e.g. ZigBee network). But alternatively, the slaves 12*b-d* could instead respond back also via the ballast 10 (e.g. each sends its response at a random time, or using a carrier sense multiple access technique). Or as another alternative, the slaves 12*b-d* could initially signal their identities to the master via the ballast 10 (without waiting for a signal from the master first). Also, the protocol for determining which to lamp is to become the master could be implemented via other means, not just radio beacons; e.g. via the ballast 10, or via coded light or ultrasound. Moreover, alternative protocols for selecting the master could be used: e.g. the master need not necessarily be the lamp with the lowest address, but could instead be the lamp with the highest address, or the address (or more generally ID) chosen according to some other rule. Or the selection need not even be based on the address or identifier, and could instead be based on some other attribute in the beacons, such as a separate priority indicator in each beacon (such that the lamp with the highest priority level becomes master).

Further, the commissioning flow is not limited to grouping lamps 12*a-d* in the same luminaire 4. More generally, the disclosed commissioning flow can also be used with other ways of determining the lamps 12 to be grouped, not just based on detecting whether in same luminaire 4. For example, other reasons to group lamps could include grouping clusters or zones of lamps within a room. In such cases, it is possible to arrange the lamps 12 to each emit a signal such as a coded light signal, radio signal or ultrasound signal comprising an identifier of the respective lamp 12 (without that signal necessarily being hindered by the respective housing 14); and to arrange each of the lamps 12 to also listen for the signals from others of its neighbouring lamps in order to measure the received signal strength (e.g. RSSI) or time-of-flight (ToF). By collecting together these measurements (either at master one of the lamps 12 or at a central device such as the commissioning tool 6 or a lighting bridge), it is possible to detect the relative distances between the different lamps 12 and thereby infer the topology of the lamps 12 in the environment 2, so as to detect which are to be considered in the same cluster.

Conversely, the disclosed techniques for detecting whether lamps are in the same luminaire may be used with other commissioning flows, not necessarily involving the manipulation of the factory new mode or the like, or indeed in any other situation where it may be desired to detect that lamps are the same luminaire 4 (e.g. for auditing purposes, or to control as a group in an ad hoc manner without a specific commissioning phase).

Further, there are other possibilities for modulating the load, other than the on/off (in/out) approach shown in FIG. 7 whereby the switch M1 is used to switch the load between either zero or the full load. E.g. alternatively, the LEDs 18 and/or driver 24 may stay connected in circuit and not be completely shorted, but a switchable or variable resistance or impedance may be included in series or in parallel with the LEDs 18 and/or driver 24, and the microcontroller 46 may control this switchable or variable resistance or impedance in order to modulate the load. Or more generally, other power line communication techniques may be available to a person skilled in the art. Moreover, the disclosed technique of modulating the power may be applied not just in the context of a ballast 10, but any other power supply circuit, e.g. a circuit comprising a transformer.

Note also for the avoidance of doubt that the term "wireless lamp" or such like, as used herein, refers to the fact that the lamp is able to communicate wirelessly, not that it does not need to be plugged in for power. in general the wireless lamp may be powered by any means, such as by mains power or by a battery, e.g. a TLED tube may be powered by an emergency lighting battery housed within the luminaire.

Further, the term beacon in this application is not restricted to be a ZigBee Beacon, but could also be any message which is sent out repeatedly by the lamp, for instance a message looking for an open network (or any message exposing an open network). Another alternative method is that the device will or will not respond to offers of open networks depending on its master/slave state. In this case, the lamps only listen and do not send beacons per se. Rather, if the commissioning tool sends an offer of an open network, the master device will react to the offer but slave device will ignore it.

Furthermore, note again that the scope of the present disclosure can also extend to the commissioning of other components, not just lamps. Hence anywhere herein where there is mentioned a lamp, this may be more read generally as a component. For example, increasingly people are using wireless means such as ZigBee (etc.) to communicate between the components even within a given luminaire. These components could include any one or more of, e.g., a smoke detector component, a security camera, a driver for driving the luminaire's lamp(s), and/or a battery such as an emergency battery for powering the first lamp(s) (and/or other components), or any of a variety of other possibilities. Any of the teachings herein could extend to the commissioning of a group of components comprising at least one lamp and one or more other types of components, e.g. to detect which components are in the same luminaire as the lamp, with each of the components being configured in a similar manner as the above-described lamps 12a-12d (at least as far as the commissioning protocol goes).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A first lamp for use as one of a plurality of wireless-communication enabled components, each respective one of the components being operable in a first mode in which the respective component appears to a commissioning tool as awaiting commissioning and a second mode in which the respective component does not appear to the commissioning tool as awaiting commissioning, and each of the components being configured to begin in the first mode as part of a commissioning process; wherein the first lamp is configured to perform steps of:

A) triggering a second one or more of the components to switch to the second mode, so that during the commissioning process the one or more second components will not to appear to the commissioning tool as awaiting commissioning;

B) operating the first lamp in the first mode, following said switching of the one or more second components to the second mode, so that the first lamp will appear to the commissioning tool as awaiting commissioning; and C) interacting with the commissioning tool on behalf of said one or more second components, in order for the first lamp and one or more second components to be commissioned as a group.

2. The first lamp of claim 1, wherein the first lamp is configured to perform said triggering of the one or more second components to switch to the second mode on the basis of being in a same luminaire as the first lamp.

3. The first lamp of claim 1, wherein each of said components is a lamp, the one or more second components being one or more second lamps.

4. The first lamp of claim 3, wherein the first lamp is configured to detect a second message emitted by each of one or more of said components, each second message communicating an identifier or other attribute of the respective component; and wherein the first lamp is further configured to determine whether to become a master for purpose of the commissioning process by comparing a corresponding identifier or attribute of the first lamp with the identifier or attribute received in each of one or more of the detected second messages, and to perform said steps A) to C) on condition of being the master.

5. The first lamp of claim 1, wherein:

each respective one of the components is configured to switch to the second mode in response to joining a wireless network of a predetermined wireless networking protocol;

the first lamp is configured to perform said triggering of the one or more second components to switch to the second mode by emitting a first message causing the second components to join a first wireless network created by the first lamp according to said wireless networking protocol, thereby causing the first lamp and one or more second components to switch to the second mode; and said step of the first lamp operating in the first mode comprises the first lamp exiting the first wireless network, following said switching of the first lamp and one or more second components to the second mode, so as to return to the first mode and thereby be discoverable to the commissioning tool.

6. The first lamp of claim 5, wherein: said wireless networking protocol is the ZigBee protocol, the first mode is the Factory New mode of the ZigBee protocol, and the second mode is the non Factory New mode of the ZigBee protocol.

7. The first lamp of claim 5, wherein:

said interaction comprises receiving a request from the commissioning tool; and the first lamp is configured, in response, to send a message to the one or more second components via the first wireless network, causing the one or more second components to report their own respective identifiers to the commissioning tool.

8. The first lamp of claim 5, wherein said interaction comprises:

joining a second wireless network, and also causing the one or more second components to exit the first wireless network in order to join the second wireless network, the second network being for controlling the components once the commissioning process is finished.

9. The first lamp of claim 8, wherein said one or more commissioning operations comprise an operation of:
being assigned, by the commissioning tool, a group address for jointly controlling the first lamp and the one or more second components via the second wireless network.

10. The first lamp of claim 8, wherein the first lamp is further configured to perform steps of:
D) after the commissioning process, detecting a replacement lamp for one of the one or more second lamps in the same luminaire; and
E) causing the replacement lamp to join the second wireless network.

11. The first lamp of claim 10, wherein the first lamp is also configured to cause the replacement lamp to be added to the group address.

12. The first lamp of claim 1, wherein:
the first lamp is configured to receive identifiers of the one or more second components, and
said interaction comprises reporting the identifiers of the one or more second components to the commissioning tool.

13. The first lamp of claim 1, wherein:
said interaction comprises receiving, on behalf of the first lamp and one or more second components, a request from the commissioning tool; and
the first lamp is configured, in response, to cause one or more of the first lamps and second components to produce a visual indication to the user of the commissioning tool indicating a grouping of the first lamp and one or more second components collectively.

14. A method of operating a plurality of wireless-communication enabled components including a first lamp, each respective one of the components being operable in a first mode in which the respective component appears to a commissioning tool as awaiting commissioning and a second mode in which the respective component does not appear to the commissioning tool as awaiting commissioning, wherein each of the components begin a commissioning process in the first mode; the method comprising steps of:
causing a second one or more of the components to switch the second mode, so that during the commissioning process the one or more second components will not to appear to the commissioning tool as awaiting commissioning;
operating the first lamp in the first mode, following said switching of the one or more second components to the second mode, so that the first lamp will appear to the commissioning tool as awaiting commissioning; and
using the first lamp to interact with the commissioning tool on behalf of said one or more second components in order for the first lamp and the one or more second components to be commissioned as a group.

15. A computer program product for operating a first lamp as one of a plurality of wireless-communication enabled components, each respective one of the components being operable in a first mode in which the respective component appears to a commissioning tool as awaiting commissioning and a second mode in which the respective component does not appear to the commissioning tool as awaiting commissioning, and each of the components being configured to participate in a commissioning process starting in the first mode; wherein the computer program product comprises code embodied on a non-transitory computer-readable storage medium and/or being downloadable therefrom, and being configured so as when run on the first lamp to perform steps of:
triggering a second one or more of the components to switch to the second mode, so that during the commissioning process the one or more second components will not to appear to the commissioning tool as awaiting commissioning;
operating the first lamp in the first mode, following said switching of the one or more second components to the second mode, so that the first lamp will appear to the commissioning tool as awaiting commissioning; and
interacting with the commissioning tool on behalf of said one or more second components in order for the first lamp and the one or more second components to be commissioned as a group.

* * * * *